United States Patent
Yofu

(10) Patent No.: US 9,458,337 B2
(45) Date of Patent: Oct. 4, 2016

(54) CURABLE RESIN COMPOSITION, WATER-SOLUBLE INK COMPOSITION, INK SET, AND IMAGE-FORMING METHOD

(71) Applicant: FUJIFILM CORPORATION, Tokyo (JP)

(72) Inventor: Katsuyuki Yofu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 2 days.

(21) Appl. No.: 14/613,647

(22) Filed: Feb. 4, 2015

(65) Prior Publication Data

US 2015/0159032 A1 Jun. 11, 2015

Related U.S. Application Data

(63) Continuation of application No. PCT/JP2013/074473, filed on Sep. 11, 2013.

(30) Foreign Application Priority Data

Sep. 28, 2012 (JP) .................................. 2012-218117

(51) Int. Cl.
| | |
|---|---|
| *C09D 11/30* | (2014.01) |
| *C09D 11/38* | (2014.01) |
| *C09D 11/107* | (2014.01) |
| *C09D 11/322* | (2014.01) |
| *C09D 11/101* | (2014.01) |
| *C09D 11/40* | (2014.01) |
| *C08F 2/50* | (2006.01) |

(52) U.S. Cl.
CPC ................. *C09D 11/30* (2013.01); *C08F 2/50* (2013.01); *C09D 11/101* (2013.01); *C09D 11/107* (2013.01); *C09D 11/322* (2013.01); *C09D 11/38* (2013.01); *C09D 11/40* (2013.01)

(58) Field of Classification Search
None
See application file for complete search history.

(56) References Cited

U.S. PATENT DOCUMENTS

| | | | |
|---|---|---|---|
| 4,459,416 A | 7/1984 | Curtis et al. | |
| 4,861,916 A | 8/1989 | Kohler et al. | |
| 5,045,573 A | 9/1991 | Kohler et al. | |
| 8,216,353 B2 | 7/2012 | Nakamura | |
| 2010/0080913 A1* | 4/2010 | Irita ................... | C09D 11/101 427/258 |
| 2012/0249700 A1* | 10/2012 | Amao .................. | C09D 11/101 347/102 |
| 2013/0016156 A1* | 1/2013 | Ooishi ................ | C09D 11/322 347/21 |

FOREIGN PATENT DOCUMENTS

| | | |
|---|---|---|
| GB | 2108487 A | 5/1983 |
| JP | H06-228218 A | 8/1994 |
| JP | 2008-247939 A | 10/2008 |
| JP | 2012-007071 A | 1/2012 |

OTHER PUBLICATIONS

International Search Report; PCT/JP2013/074473; Dec. 17, 2013.

* cited by examiner

*Primary Examiner* — An Do
*Assistant Examiner* — Renee I Wilson
(74) *Attorney, Agent, or Firm* — Studebaker & Brackett PC

(57) ABSTRACT

A curable resin composition comprises fine particles, a polymerizable compound having an ethylenic unsaturated group, a photopolymerization initiator having a betaine structure; and water.

11 Claims, No Drawings

CURABLE RESIN COMPOSITION, WATER-SOLUBLE INK COMPOSITION, INK SET, AND IMAGE-FORMING METHOD

CROSS-REFERENCE TO RELATED APPLICATIONS

This application is a Continuation of PCT International Application No. PCT/JP2013/74473, filed on Sep. 11, 2013, which claims priority under 35 U.S.C. §119(a) to Japanese Patent Application No. 2012-218117, filed on Sep. 28, 2012. Each of the above application(s) is hereby expressly incorporated by reference, in its entirety, into the present application.

BACKGROUND OF THE INVENTION

1. Field of the Invention

The present invention relates to a curable resin composition, a water-soluble ink composition, an ink set, and an image-forming method.

2. Description of the Related Art

A curable resin composition, which crosslinks a binder and the like in association with a polymerizable compound having an ethylenic unsaturated group as a crosslinking agent when imparted with energy such as light or heat and is cured, has been widely used for industrial usages such as a coating material, paint, printing ink, an adhesive, an optical material, a laminating material for electronic products, an electrical insulating material, and a resist material. A cross-linking compound is cured when irradiated with an active energy ray such as an ultraviolet ray. For example, the cross-linking compound as a curing agent or a crosslinking agent is blended into ink or paint, and after an image is formed, the cross-linking compound is polymerized by being irradiated with an ultraviolet ray or the like so as to form a cured film, thereby improving the weather resistance or durability of the image.

Among the curable resin compositions, for ink compositions, recently, there has been a demand for reducing a volatile organic compound (VOC), which has been widely used in the related art as a solvent or the like, from the viewpoint of environmental protection or safety, and accordingly, a waterborne photocurable system capable of reducing the usage amount of the VOC is attracting attention. Even in the field of printing ink, there have been a variety of proposals regarding waterborne photocurable ink in which a water-soluble solvent such as water or an alcohol is used as a medium, and the curable resin compositions are also applied to ink jet recording methods.

In the ink jet recording method, since a printing apparatus is inexpensive, no plate is required during printing, and an image is directly formed on a recording medium by discharging ink only to required image sections, ink can be efficiently used, and there is an advantage of having inexpensive operational costs particularly in the case of small lot production. Furthermore, only a small amount of noise is generated, and recently, the method has been attracting attention as an excellent image-recording method.

In ink for photocurable ink jet recording, generally, an image is formed using an aqueous ink containing a polymerizable compound and a polymerization initiator, and the image is cured and fixed by radiating light. Light in the ultraviolet (UV) range is generally used as a light source. Since a majority of ink components is cured through light radiation, drying properties are superior to those of solvent-based ink, images do not easily bleed, and thus the ink can be printed on a variety of recording media, which makes the ink jet recording method excellent.

In the above-described waterborne ink for photocurable ink jet recording, a water-soluble photopolymerization initiator is used; however, among photopolymerization initiators that are commercially available at the present time, only a limited range of photopolymerization initiators such as α-hydroxyacetophenone-based initiators are being used, and the degree of solubility in water is also insufficient. As a result, there has been a proposal regarding the introduction of an ionic substituent such as carboxylate or sulfonate (refer to JP1994-228218A (JP-H6-228218A), JP2008-247939A, and GB2108487B), but the temporal stability of ink easily degrades (ink easily aggregates), and it cannot be said that this method has been satisfactory at all times. In addition, recently, there has been a proposal (refer to JP2012-7071A) regarding an ink composition in which a thioxanthone photopolymerization initiator containing a salt of a hydroxyl group, a carboxyl group, or a sulfo group and an α-aminoacetophenone photopolymerization initiator containing a salt of a hydroxyl group, a carboxyl group, or a sulfo group are jointly used, but there has been a demand for performance to be further improved.

SUMMARY OF THE INVENTION

An object of the present invention is to provide a curable resin composition, a water-soluble ink composition, an ink set, and an image-forming method in which both a high sensitivity with respect to ultraviolet rays and a high degree of solubility in water are provided, and an adverse influence on the stability of curable resin compositions, particularly, ink compositions is small.

The present inventors carried out intensive studies in consideration of the above-described object. As a result, it was found that a photopolymerization initiator having a betaine structure has an excellent degree of solubility in water, excellent safety in water-soluble resin compositions, and furthermore excellent radical initiation performance as a photopolymerization initiator. The present invention has been completed on the basis of the above-described finding.

That is, the above-described object has been achieved by the following means.

(1) A curable resin composition including fine particles, a polymerizable compound having an ethylenic unsaturated group, a photopolymerization initiator having a betaine structure, and water.

(2) The curable resin composition according to (1) in which the photopolymerization initiator having a betaine structure has any of a benzophenone skeleton, a thioxanthone skeleton, a thiochromanone skeleton, a biimidazole skeleton, an α-aminoacetophenone skeleton, an α-hydroxyacetophenone skeleton, or a benzyl ketal skeleton.

(3) The curable resin composition according to (1) or (2) in which the betaine structure of the photopolymerization initiator is represented by at least one of Formulae (1) to (3) described below.

[Chem. 1]

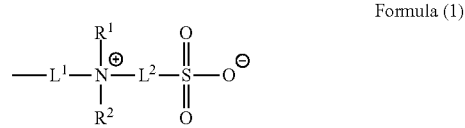

Formula (1)

Formula (2)

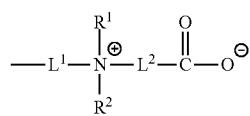

Formula (3)

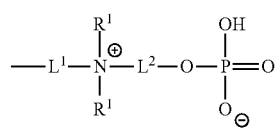

(In Formulae (1) to (3), each of $R^1$ and $R^2$ independently represents an alkyl group. $L^1$ represents a single bond or a divalent linking group, and $L^2$ represents a divalent linking group.)

(4) The curable resin composition according to any one of (1) to (3) in which the fine particles are pigments or resin particles.

(5) A water-soluble ink composition comprising the curable resin composition according to any one of (1) to (4).

(6) The water-soluble ink composition according to (5) in which the fine particles are pigments.

(7) The water-soluble ink composition according to (5) or (6) in which at least one of the polymerizable compounds having an ethylenic unsaturated group is a bi- or more functional (meth)acrylamide compound.

(8) An ink set including the water-soluble ink composition according to any one of (5) to (7) and an acidic ink composition containing an acidic compound having a molecular weight in a range of 50 to 200 and pKa in water in a range of 1 to 5.

(9) An image-forming method including an acid treatment step of supplying an acidic ink composition onto a recording medium; and an ink supply step of supplying the water-soluble ink composition according to any one of (5) to (7) onto the acid-treated recording medium to form an image.

(10) The image-forming method according to (9) in which, in the ink supply step, the ink is supplied by an ink jet method.

In the present invention, "(meth)acrylamide" represents either or both of acrylamide and methacrylamide.

According to the present invention, it is possible to provide a curable resin composition, a water-soluble ink composition, an ink set, and an image-forming method in which both a high sensitivity with respect to ultraviolet rays and a high degree of solubility in water are provided, and an adverse influence on the stability of curable resin compositions, particularly, ink compositions is small.

DESCRIPTION OF THE PREFERRED EMBODIMENTS

A curable resin composition of the present invention includes fine particles, a polymerizable compound having an ethylenic unsaturated group, a photopolymerization initiator having a betaine structure, and water.

Hereinafter, the curable resin composition of the present invention will be described.

<<Curable Resin Composition>>

<Fine Particles>

The fine particles in the present invention refer to nano-sized organic particles or inorganic particles, and examples thereof include pigment or resin particles. The volume average particle diameter of the pigment is preferably in a range of 10 nm to 200 nm, more preferably in a range of 10 nm to 150 nm, and still more preferably in a range of 10 nm to 100 nm. The volume average particle diameter of the resin particles is preferably in a range of 1 nm to 2000 nm, more preferably in a range of 1 nm to 500 nm, and still more preferably in a range of 1 nm to 100 nm.

There is no particular limitation regarding the particle size distribution, and the particle size distribution may be wide or monodisperse. In addition, a mixture of two or more kinds of particles having a monodisperse particle size distribution may be used.

The volume average particle diameter and particle size distribution of the fine particles can be measured using, for example, a light scattering method.

—Pigment—

The curable resin composition of the present invention includes the fine particles, and in a case in which the curable resin composition of the present invention is a water-soluble ink composition, the fine particles are preferably a pigment. In this case, one or more kinds of pigments may be used. In addition, both a pigment and resin particles may be included.

There is no particular limitation regarding the kinds of the pigment, and a well-known organic or inorganic pigment of the related art can be used. Examples of the pigment include polycyclic pigments such as azo lake, azo pigments, phthalocyanine pigments, peryline or perinone pigments, anthraquinone pigments, quinacridone pigments, dioxazine pigments, diketo pyrrolo pyrrole pigments, thioindigo pigments, isoindolinone pigments, and quinophthalone pigments, dye lakes such as basic dye-type lakes and acidic dye-type lakes, organic pigments such as nitro pigments, nitroso pigments, aniline black, and daylight fluorescent pigments, and inorganic pigments such as titanium oxide, iron oxide, and carbon black. In addition, any pigments, even pigments that are not described in the color index, can be used as long as the pigments can be dispersed in a water phase. Furthermore, the pigments the surface of which is treated using a surfactant, a macromolecular dispersing agent, or the like, graft carbon, and the like also can be used.

Among the above-described pigments, azo pigments, phthalocyanine pigments, anthraquinone pigments, quinacridone pigments, and carbon black-based pigments are particularly preferred.

—Resin Particles—

The resin particles used in the present invention refer to particles which are different from a polymer dispersing agent (a polymer dispersing agent that covers at least a part of the pigment) and a pigment, and which are not used for coloring or as a color material.

For example, in a case in which an image is formed using the ink jet method or the like, when the ink composition includes the resin particles, the resin particles aggregate due to an organic acidic compound in a treatment fluid. Therefore, the fixing property or aggregation rate of the image improves. As described above, in a case in which the ink composition includes the resin particles, when a recording medium is treated using a treatment fluid, the aggregation rate is suppressed to a certain extent, and the spreading of ink droplets is accelerated. This suppresses the surface roughness of an image or the degradation of the uniformity of an image, which is caused by the insufficient spreading of ink droplets.

The resin particles being used are preferably resin particles that are insoluble or not easily dissolved in water.

The "being insoluble or not easily dissolved in water" refers to the fact that, when a resin is dried at 105° C. for two hours, and then is dissolved in 100 g of water at 25° C., the amount of the resin dissolved is 15 g or less. From the viewpoint of improving the continuous discharge property and discharge stability of ink, the amount of the resin particles dissolved is preferably 10 g or less, more preferably 5 g or less, and still more preferably 1 g or less. The amount of the resin particles dissolved refers to the amount of the resin particles dissolved when the resin particles are 100% neutralized using sodium hydroxide or acetic acid depending on the kind of an acid-generating group in a water-insoluble polymer.

Examples of the resin particles include particles of thermosetting, thermoplastic, or denatured resins having an anionic group such as (meth)acryl-based resins, epoxy-based resins, polyurethane-based resins, polyether-based resins, polyamide-based resins, unsaturated polyester-based resins, phenol-based resins, silicone-based resins, fluorine-based resins, polyvinyl-based resins such as vinyl chloride, vinyl acetate, polyvinyl alcohol, and polyvinyl butyral, polyester-based resins such as alkyd resins and phthalic acid resins, amino-based resins such as melamine resins, melamine formaldehyde resins, aminoalkyd-cocondensed resins, and urea resins, and copolymers or mixtures thereof. Among them, the anionic (meth)acryl-based resins are obtained by, for example, polymerizing a (meth)acryl monomer having an anionic group [anionic group-containing (meth)acryl monomer] and, as necessary, another monomer that can copolymerize with the anionic group-containing (meth)acryl monomer. Examples of the anionic group-containing (meth)acryl monomer include (meth)acyl monomers having one or more selected from a group consisting of a carboxyl group, a sulfur group, a phospho group, and salts thereof, and among them, (meth)acryl monomers having a carboxyl group or a salt thereof (for example, acrylic acid, methacrylic acid, crotonic acid, ethacrylic acid, propyl acrylic acid, isopropyl acrylic acid, itaconic acid, fumaric acid, salts thereof, and the like) are preferred, and acrylic acid, methacrylic acid, and salts thereof are particularly preferred.

In the present invention, from the viewpoint of image-fixing properties and the suppression of ink jet nozzle clogging, the content of the resin particles in the curable resin composition, particularly, the ink composition is preferably in a range of 0.01 mass % to 20 mass %, more preferably in a range of 0.05 mass % to 10 mass %, and particularly preferably in a range of 0.1 mass % to 5 mass % with respect to the total amount of the curable resin composition or the ink composition.

A single kind of the resin particles may be used, or a combination of two or more kinds may be used.

—Dispersing Agent—

In the curable resin composition of the present invention, particularly, the ink composition, the pigment is preferably dispersed using a dispersing agent. When the resin particles can be dispersed on their own, it is not necessary to use a dispersing agent; however, when the resin particles cannot be dispersed on their own, the resin particles are preferably dispersed using a dispersing agent.

Any dispersing agent may be used as long as the dispersing agent is capable of dispersing the pigment or the resin particles (particularly, the pigment).

In addition, the dispersing agent may be any of cationic, anionic, and nonionic dispersing agents.

Examples of the dispersing agent include dispersing agents for low-molecular surfactants and polymers, and, in the present invention, polymer dispersing agents are preferred. Hereinafter, a pigment at least a part of which is coated with the polymer dispersing agent will also be referred to a "resin-coated pigment".

Examples of the low-molecular surfactants include the surfactants described in paragraphs 0016 to 0020 of JP2010-188661A.

The polymer dispersing agent may be a water-soluble polymer dispersant or a water-insoluble polymer dispersant.

A hydrophilic macromolecular compound can be used as the water-soluble polymer dispersing agent, and examples thereof include the natural hydrophilic macromolecular compounds described in paragraphs 0021 and 0022 in JP2010-188661A.

In addition to the natural hydrophilic macromolecular compound, it is also possible to use a synthetic hydrophilic macromolecular compound.

Examples of the synthetic hydrophilic macromolecular compound include macromolecular compounds having a salt of a cationic functional group in a side chain such as vinyl-based macromolecules such as polyvinyl alcohol, polyvinyl pyrrolidone, and polyvinyl methyl ether, acryl-based resins such as polyacrylamide, polyacrylic acid or alkali metal salts thereof, and water-soluble styrene acryl resins, alkali metal salts of water-soluble styrene maleic acid resins, water-soluble vinyl naphthalene acryl resins, water-soluble vinyl naphthalene maleic acid resins, polyvinyl pyrrolidone, polyvinyl alcohol, and β-naphthalene sulfonic acid formalin condensates, quaternary ammonium, and amino groups.

Among them, from the viewpoint of the dispersion stability and aggregating property of the pigment, macromolecular compounds having a carboxyl group and a salt thereof are preferred, and, for example, macromolecular compounds having a carboxyl group or a salt thereof such as acryl-based resins such as water-soluble styrene acryl resins, water-soluble styrene maleic acid resins, water-soluble vinyl naphthalene acryl resins, and water-soluble vinyl naphthalene maleic acid resins are particularly preferred.

As the water-insoluble dispersing agent among the monomer dispersing agents, it is possible to use a polymer having both a hydrophobic part and a hydrophilic part. Examples thereof include styrene-(meth)acrylic acid copolymers, styrene-(meth)acrylic acid-(meth)acrylic acid ester copolymers, (meth)acrylic acid ester-(meth)acrylic acid copolymers, polyethylene glycol (meth)acrylate-(meth)acrylic acid copolymers, styrene-maleic acid copolymers, and the like.

Among them, styrene-(meth)acrylic acid copolymers, (meth)acrylic acid ester-(meth)acrylic acid copolymers, polyethylene glycol (meth)acrylate-(meth)acrylic acid copolymers, and styrene-maleic acid copolymers may be binary copolymers or ternary or more copolymers.

Among them, as the polymer dispersing agent, (meth)acrylic acid ester-(meth)acrylic acid copolymers are preferred, and a ternary copolymer of benzyl (meth)acrylate-(meth)acrylate-methyl (meth)acrylate is particularly preferred.

Here, (meth)acrylic acid refers to acrylic acid or methacrylic acid, and (meth)acrylate refers to acrylate or methacrylate.

The mass average molecular weight of the polymer dispersing agent is preferably in a range of 3,000 to 200,000, more preferably in a range of 5,000 to 100,000, still more preferably in a range of 5,000 to 80,000, and particularly preferably in a range of 10,000 to 60,000.

The acid value of the polymer dispersing agent is not particularly limited; however, from the viewpoint of aggregating properties, the acid value thereof is preferably greater than the acid value of the resin particles described below (preferably self-dispersing resin particles).

In the curable resin composition of the present invention, particularly, the ink composition, the mass ratio of the pigment to the dispersing agent (pigment:dispersing agent) is preferably in a range of 1:0.06 to 1:3, more preferably in a range of 1:0.125 to 1:2, and still more preferably in a range of 1:0.125 to 1:1.5.

The average particle diameter of the pigment (the average particle diameter of the resin-coated pigment in the case of the resin-coated pigment) is preferably in a range of 10 nm to 200 nm, more preferably in a range of 10 nm to 150 nm, and still more preferably in a range of 10 nm to 100 nm. When the average particle diameter is 200 nm or less, the color reproducibility becomes favorable, the ink strike characteristics becomes favorable when ink droplets are stricken using the ink jet method, and, when the average particle diameter is 10 nm or more, the light resistance becomes favorable. The particle size distribution of the pigment is not particularly limited, and may be any of a wide particle size distribution or a monodisperse particle size distribution. In addition, a mixture of two kinds of pigments having a monodisperse particle size distribution may be used.

The average particle diameter and particle size distribution of the pigment can be obtained by measuring the volume average particle diameter through a dynamic light scattering method using a nanotrack particle size distribution measuring apparatus UPA-EX150 (manufactured by Nikkiso Co., Ltd.).

In the present invention, from the viewpoint of the image density, the content of the pigment in the curable resin composition, particularly, the ink composition is preferably in a range of 1 mass % to 25 mass %, more preferably in a range of 2 mass % to 20 mass %, and particularly preferably in a range of 2 mass % to 10 mass % with respect to the total amount of the curable resin composition or the ink composition.

A single kind of the pigment may be used, or a combination of two or more kinds may be used.

In the curable resin composition of the present invention, particularly, the ink composition, the mass ratio of the resin particles to the dispersing agent (resin particles:dispersing agent) is preferably in a range of 1:0 to 1:3, more preferably in a range of 1:0 to 1:2, and still more preferably in a range of 1:0 to 1:1.5.

<Polymerizing Compound Having an Ethylenic Unsaturated Group>

The polymerizable compound having an ethylenic unsaturated group is a compound having at least one ethylenic unsaturated bond that can radical-polymerize in a molecule, and there is no particular limitation as long as the polymerization reaction of the compound can be initiated using a photopolymerization initiator. In addition, the polymerizable compound may be any of a monomer, an oligomer, a polymer, and the like.

The ethylenic unsaturated group refers to a group having a carbon-carbon double bond, and the carbon-carbon double bond may be conjugated with other saturated bonds, but does not have any double bond in a stable aromatic ring such as a benzene ring.

Examples of the ethylenic unsaturated group include groups having a partial structure of —C(=O)CH=CHC(=O)— such as a vinyl group (—CH=CH$_2$), a (meth)acryloyl group [—C(=O)CH=CH$_2$, —C(=O)C(CH$_3$)=CH$_2$], a vinyl sulfonyl group (—SO$_2$CH=CH$_2$), or maleimide.

Here, examples of the vinyl group include —O—CH=CH$_2$, >N—CH=CH$_2$, —S—CH=CH$_2$, —O—CH$_2$CH=CH$_2$, —CH=CH$_2$ in styrene, and the like, and examples of the (meth)acryloyl group include a (meth)acryloyl group, a (meth)acryloyloxy group, a (meth)acryloylamide group, and the like.

The polymerizable compound having the ethylenic unsaturated group is preferably a compound having a carbon-carbon double bond at the terminal in the molecule or a compound having a maleimide cyclic group in the molecule.

The polymerizable compound having the ethylenic unsaturated group is preferably a water-soluble compound from the viewpoint of the discharge stability of the curable resin composition, particularly, the ink composition. The degree of solubility of the polymerizable compound having the ethylenic unsaturated group is not particularly limited, but the degree of solubility in water at 25° C. is preferably 2 mass % or more, more preferably 5 mass % or more, still more preferably 10 mass % or more, and particularly preferably 20 mass % or more, and a homogeneous mixture of the polymerizable compound having the ethylenic unsaturated group with water at an arbitrary ratio is most preferred.

Specific examples of the polymerizable compound include (meth)acrylamide compounds, (meth)acrylate compounds, vinyl compounds, maleimide compounds, vinyl sulfone compounds, N-vinylamide compounds, and the like. The compound is preferably a di- or more functional compound, more preferably a (meth)acrylamide compound, a (meth)acrylate compound, or a vinyl compound, and particularly preferably a bi- or more functional (meth)acrylamide compound. In addition, in the ink composition of the present invention, the polymerizable compound may be singly used, or two or more kinds of the polymerizable compounds may be jointly used. In a case in which two or more kinds of the polymerizable compounds are jointly used, it is preferable to use a mixture of two or more kinds selected from (meth)acrylamide compounds, (meth)acrylate compounds, vinyl compounds, maleimide compounds, vinyl sulfone compounds, and N-vinylamide compounds, and, among them, it is more preferable to use a mixture in which at least one kind of the polymerizable compound is a (meth)acrylamide compound.

From the viewpoint of improving the water solubility, the polymerizable compound may have a poly(ethyleneoxy) chain, a poly(propyleneoxy) chain, an ionic group (for example, a carboxyl group, a sulfo group, or the like), a hydroxyl group, or the like.

As the (meth)acrylamide compound, it is possible to use any of a monofunctional (meth)acrylamide compound and a polyfunctional (meth)acrylamide compound, and a polyfunctional (meth)acrylamide compound is preferred. Hereinafter, specific examples of the monofunctional (meth)acrylamide compound and the polyfunctional (meth)acrylamide compound will be illustrated, but the present invention is not limited thereto.

[Chem. 2]
(Monofunctional (meth)acrylamide)

monomer 1
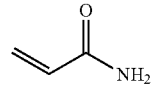

monomer 2
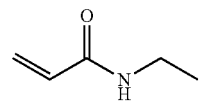

-continued
monomer 3
monomer 4
monomer 5
monomer 6
monomer 7
monomer 8
monomer 9
monomer 10
monomer 11
monomer 12
monomer 13
monomer 14
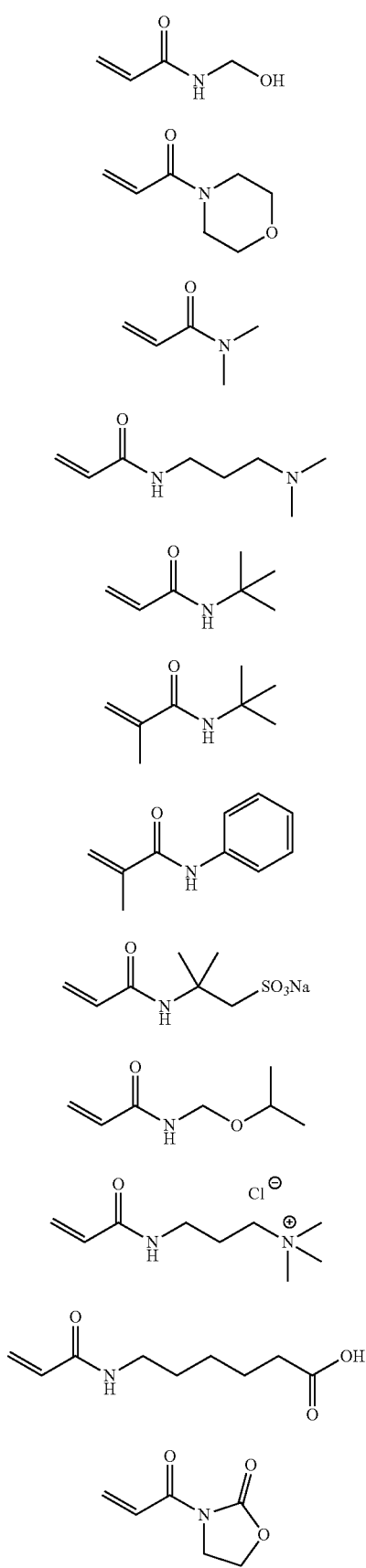
-continued
monomer 15
monomer 16
monomer 17
monomer 18
monomer 19
monomer 20
[Chem. 3]
(Polyfunctional (meth)acrylamide)
monomer 21
monomer 22
monomer 23
monomer 24
monomer 25
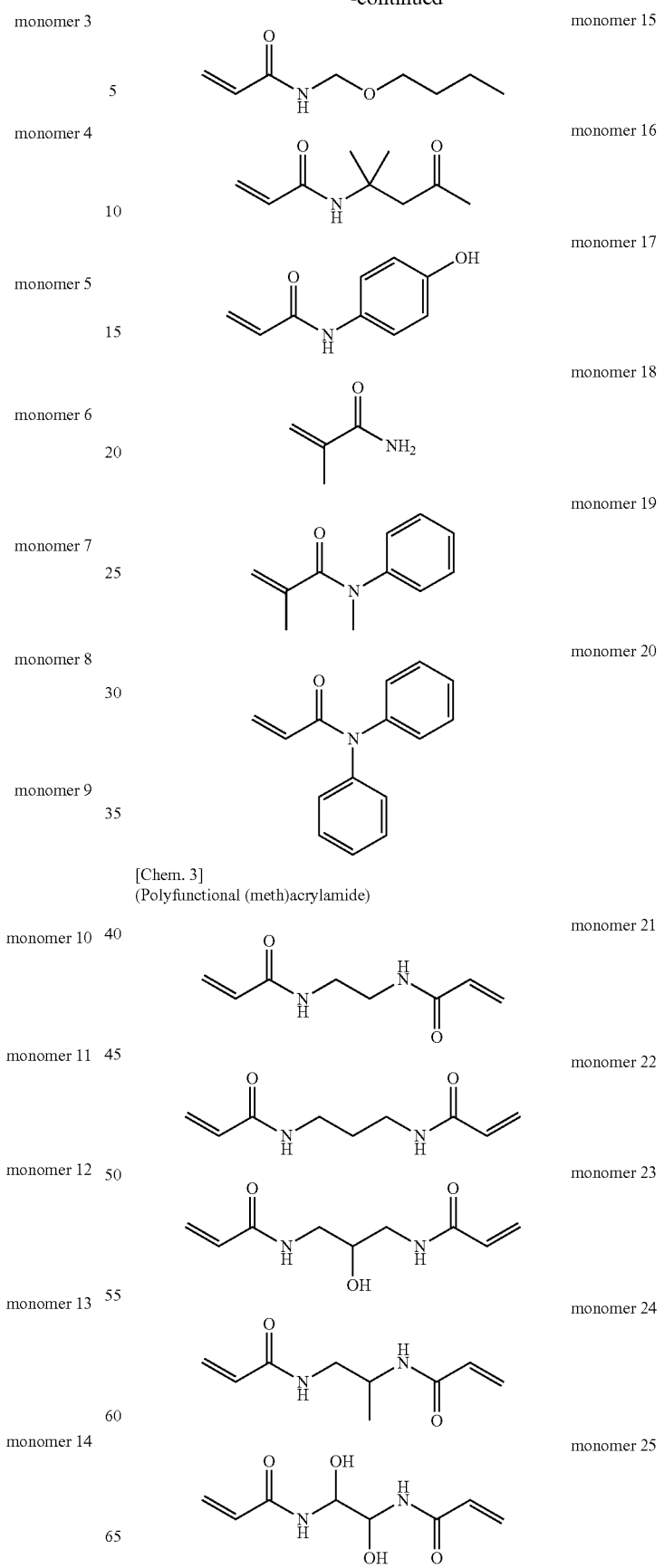

monomer 26
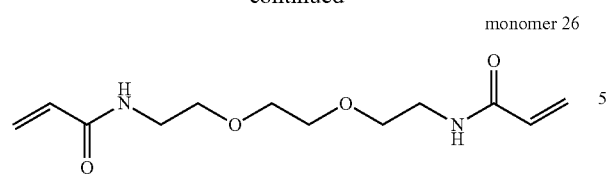
monomer 27
monomer 28
monomer 29
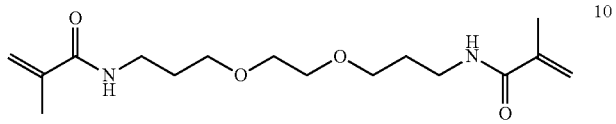
monomer 30
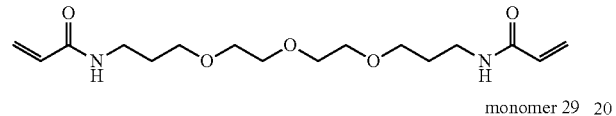
monomer 31
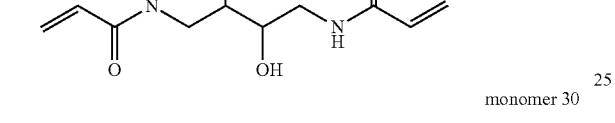
monomer 32
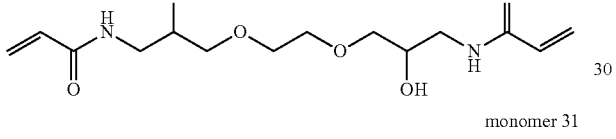
monomer 33
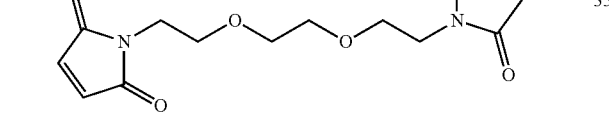
monomer 34
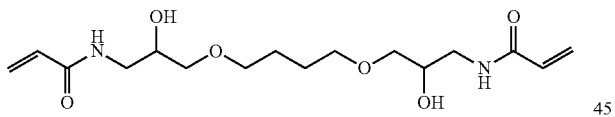
monomer 35
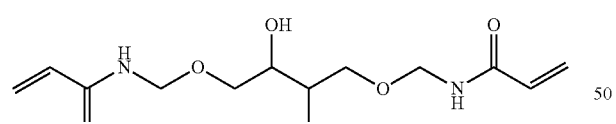
monomer 36
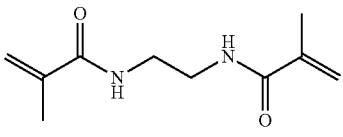
monomer 37
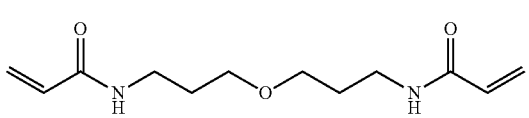
monomer 38
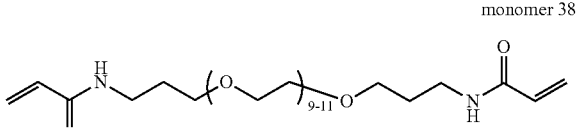
monomer 39
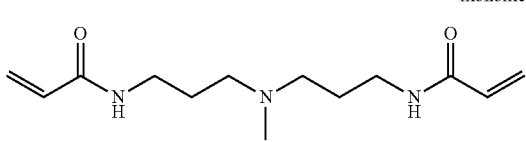
monomer 40
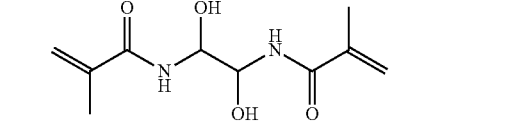
[Chem. 4]
monomer 41
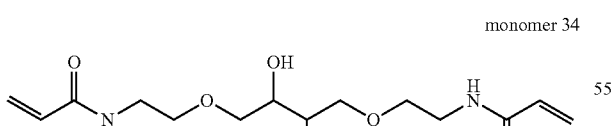
monomer 42
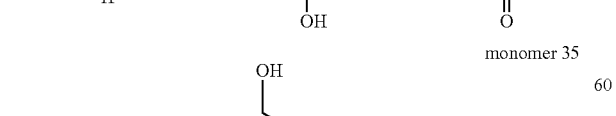

-continued monomer 43

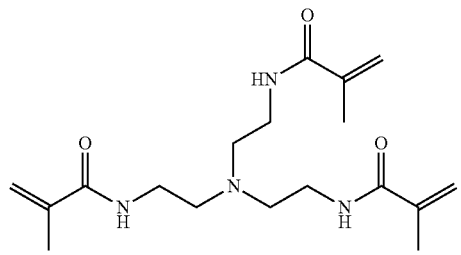

monomer 44

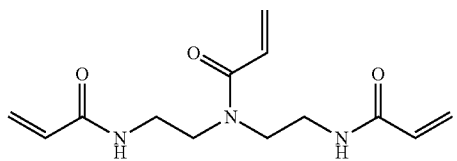

monomer 45

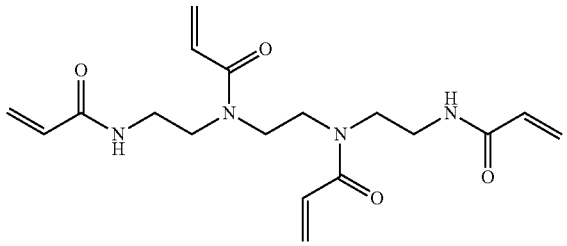

monomer 46

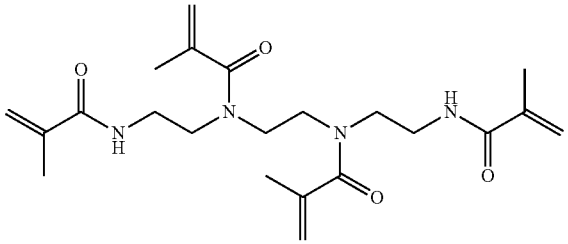

monomer 47

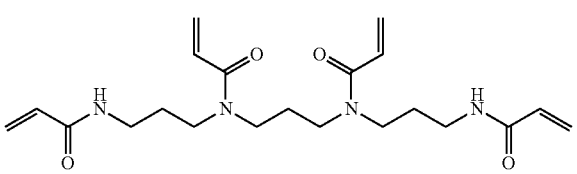

monomer 48

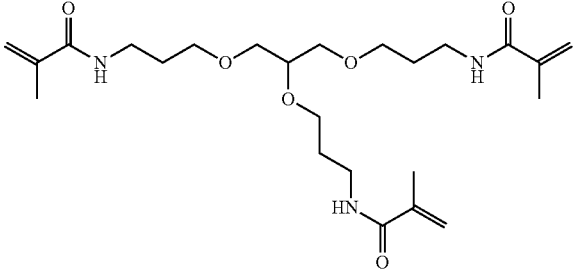

-continued monomer 49

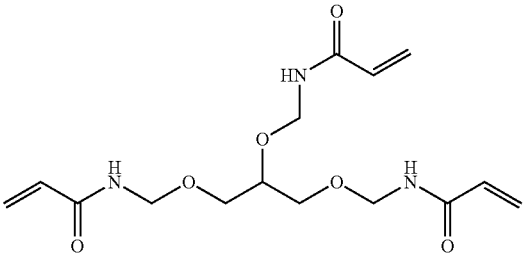

monomer 50

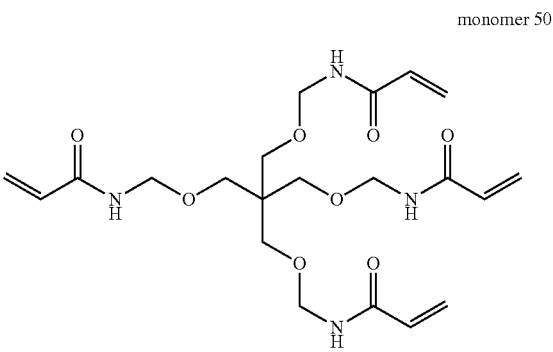

monomer 51

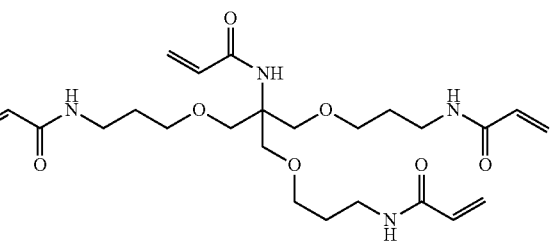

From the viewpoint of curing properties and solubility, monomers 21, 27, 28, 42, 44, and 51 are preferred.

These (meth)acrylamide compounds can be synthesized using an ordinary method for synthesizing an acrylamide compound (for example, Journal of the American Chemical Society, 101, 5383 (1979)).

As the (meth)acrylamide compound, it is possible to use any of a monofunctional (meth)acrylamide compound [compound having a (meth)acrylate group] and a polyfunctional (meth)acrylamide compound, and a polyfunctional (meth) acrylamide compound is preferred.

Specific examples of the monofunctional (meth)acrylate compound include isoamyl (meth)acrylate, stearyl (meth)acrylate, lauryl (meth)acrylate, octyl (meth)acrylate, isooctyl (meth)acrylate, decyl (meth)acrylate, isoamylstyl (meth)acrylate, isostearyl (meth)acrylate, 2-ethylhexyldiglycol (meth)acrylate, 2-hydroxybutyl(meth)acrylate, butoxyethyl (meth)acrylate, methoxydiethyleneglycol (meth)acrylate, methoxypolyethyleneglycol (meth)acrylate, methoxypropyleneglycol (meth)acrylate, tetrahydrofurfuryl (meth)acrylate, isobornyl (meth)acrylate, 2-hydroxyethyl(meth)acrylate, 2-hydroxypropyl(meth)acrylate, 2-(meth)acryloxyethylsuccinic acid, 2-(meth)acryloxyethyl-2-hydroxyethyl-phthalic acid, lactone denatured flexible (meth)acrylate, t-butylcyclohexyl (meth)acrylate, 2-(2-ethoxyethoxy)ethyl acrylate, cyclopentenyl acrylate, cyclopentenyloxyethyl acrylate, dicyclopentanyl acrylate, and the like.

Specific examples of the polyfunctional (meth)acrylate compound include bis(4-acryloxypolyethoxyphenyl)propane, neopentyl glycol di(meth)acrylate, ethoxylated (2) neopentyl glycol di(meth)acrylate (a compound obtained by diacrylating neopentyl glycol ethylene oxide 2 mol adduct), propoxylated (2) neopentyl glycol di(meth)acrylate (a compound obtained by diacrylating neopentyl glycol propylene oxide 2 mol adduct), 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, pentaerythritol tri(meth)acrylate, pentaerythritol tetra(meth)acrylate, dipentaerythritol tetra(meth)acrylate, trimethylolpropane tri(meth)acrylate, tetramethylolmethane tetra(meth)acrylate, tetramethylolmethane tri(meth)acrylate, dimethyloltricyclodecane di(meth)acrylate, denatured glycerine tri(meth)acrylate, denatured bisphenol A di(meth)acrylate, propylene oxide (PO) adduct di(meth)acrylate of bisphenol A, ethylene oxide (EOP) adduct di(meth)acrylate of bisphenol A, dipentaerythritol hexa(meth)acrylate, caprolactone-denatured dipentaerythritol hexa(meth)acrylate, and the like.

The content of the polymerizable compound having the ethylenic unsaturated group in the curable resin composition, particularly, the ink composition is preferably in a range of 1 mass % to 50 mass %, more preferably in a range of 1 mass % to 40 mass %, and still more preferably in a range of 1 mass % to 30 mass % with respect to the total amount of the solid content of the composition.

In the present specification, "the total amount of a solid content" or "the total solid content" refers to the total mass of all components in a composition excluding a solvent component.

<Photopolymerization Initiator>

At least one kind of the polymerization initiator used in the present invention has a betaine structure.

In addition, in the present invention, when the polymerization initiator has a betaine structure, the skeleton of the photopolymerization initiator may be any photo radical polymerization initiator skeleton.

Examples thereof include (a) aromatic ketones, (b) acylphosphine compounds, (c) aromatic onium salt compounds, (d) organic peroxide, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon halogen bond, (m) alkylamine compounds, and the like. More specific examples thereof include the polymerization initiators and the like described in "Ultraviolet curing system" by Kato Kiyomi, pp. 65 to 148, and published by United Engineering Center (1989), and the like.

Among them, from the viewpoint of being highly stable in water (not easily being hydrolyzed), a benzophenone skeleton, a thioxanthone skeleton, a thiochromanone skeleton, a biimidazole skeleton, an α-aminoacetophenone skeleton, an α-hydroxyacetaphenone skeleton, or a benzyl ketal skeleton is preferred, and compounds represented by Formulae (A) to (G) are preferred.

[Chem. 5]

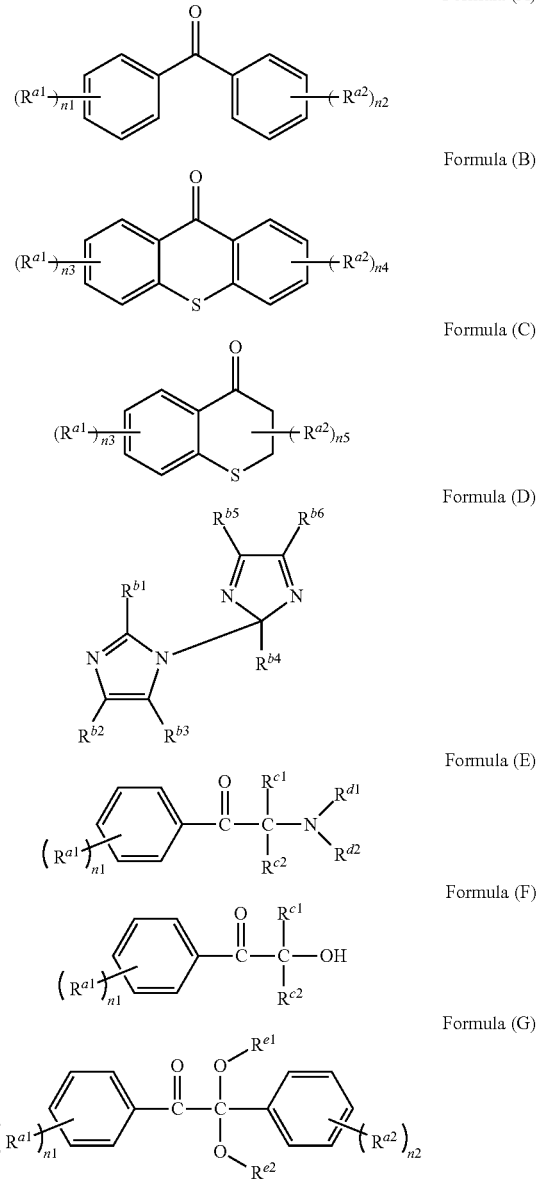

In Formulae (A) to (G), each of $R^{a1}$, $R^{a2}$, $R^{b1}$, to $R^{b6}$, $R^{c1}$, $R^{c2}$, $R^{e1}$, and $R^{e2}$, independently represents a substituent. Each of $R^{d1}$ and $R^{d2}$ independently represents a hydrogen atom or a substituent. Here, $R^{d1}$ and $R^{d2}$ may be bonded to each other so as to form a ring. Each of n1 and n2 independently represents an integer of 0 to 5, and each of n3 and n4 independently represents an integer of 0 to 4. n1+n2 is in a range of 1 to 10, and n3+n4 and n3+n5 are in a range of 1 to 8.

Any one of $R^{a1}$ and $R^{a2}$ in Formulae (A), (B), and (C), $R^{b1}$ to $R^{b6}$ in Formulae (D), $R^{a1}$, $R^{c1}$, $R^{c2}$, $R^{d1}$, and $R^{d2}$ in Formulae (E), $R^{a1}$, $R^{c1}$, and $R^{c2}$ in Formulae (F), $R^{a1}$, $R^{a2}$, $R^{e1}$, and $R^{e2}$ in Formulae (G) is a substituent having a betaine structure.

Each of $R^{a1}$ and $R^{a2}$ is preferably an alkyl group, an aryl group, an alkoxy group, an aryloxy group, an alkylthio group, an alkyl amino group, an aryl amino group, an ammonio group, or a halogen atom, all of which have 1 to 10 carbon atoms.

Each of $R^{b1}$ to $R^{b6}$ is preferably an alkyl group or an aryl group which have 1 to 10 carbon atoms, and more preferably an aryl group.

Each of $R^{c1}$, $R^{c2}$, $R^{e1}$, and $R^{e2}$ is preferably an alkyl group having 1 to 4 carbon atoms.

Each of $R^{d1}$ and $R^{d2}$ is preferably an alkyl group having 1 to 8 carbon atoms.

—Betaine Structure—

The betaine structure is a structure having a cationic portion and an anionic portion, the betaine structure may be present in one substituent, or an anionic group and a cationic group may be separately present at different groups.

The cationic portion is preferably an onium such as ammonium or sulfonium, and ammonium is preferred. Examples of the anionic portion include a sulfo group or anions thereof, a carboxyl group or anions thereof, and a phosphor group or anions thereof.

In the present invention, the anionic portion and the cationic portion are preferably present in the same group.

Examples of structures having the anionic portion and the cationic portion in the same group include structures having the cationic group at the terminal of the group and structures having the anionic group at the terminal of the group, and, in the present invention, structures having the anionic group at the terminal are preferred.

The structures having the anionic portion and the cationic portion in the same group are preferably structures represented by Formulae (1) to (3) described below.

[Chem. 6]

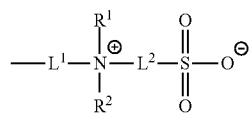

Formula (1)

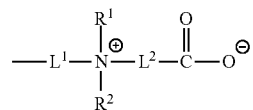

Formula (2)

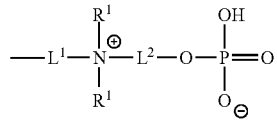

Formula (3)

In Formulae (1) to (3), each of $R^1$ and $R^2$ independently represents an alkyl group. $L^1$ represents a single bond or a divalent linking group, and $L^2$ represents a divalent linking group.

In $R^1$ and $R^2$, the number of carbon atoms in the alkyl group is preferably in a range of 1 to 6, more preferably in a range of 1 to 4, and particularly preferably 1 or 2.

Each of $L^1$ and $L^2$ is preferably an alkylene group, an arylene group, —O—, —S—, —N(Ra)—, or a divalent group obtained by combining them. Here, Ra represents a hydrogen atom, an alkyl group, or an aryl group.

The number of carbon atoms in the alkylene group is preferably in a range of 1 to 8, more preferably in a range of 1 to 6, and still more preferably in a range of 1 to 4.

$L^1$ is preferably a single bond, —O-alkylene-, —S-alkylene-, or —N(Ra)-alkylene-, and $L^2$ is preferably an alkylene group.

Hereinafter, specific examples of the compounds represented by Formulae (1), (2), and (3) will be illustrated, but the present invention is not limited thereto.

[Chem. 7]

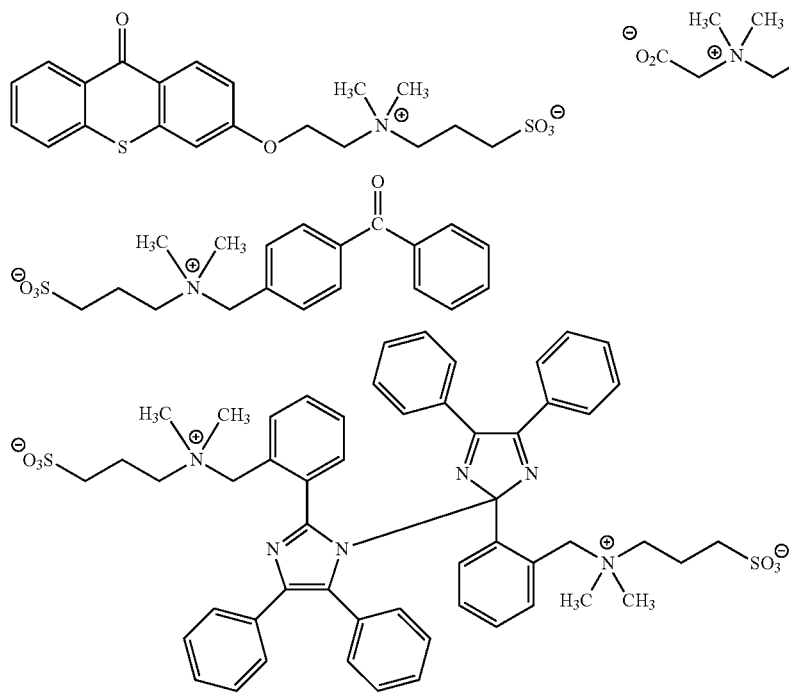

I-5
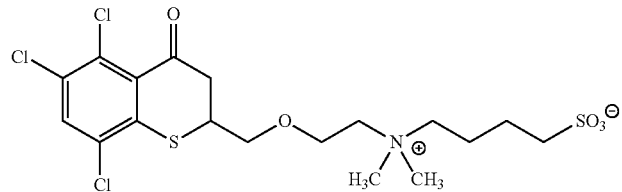
I-6
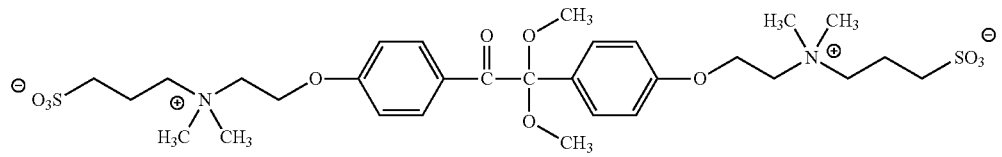
I-7
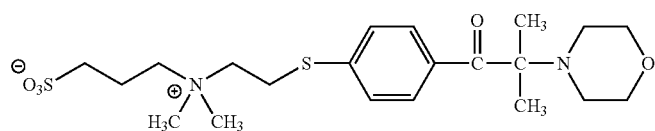
I-8
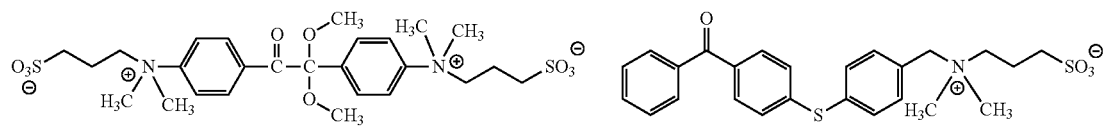
I-9
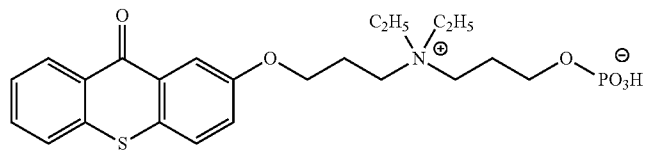
I-10
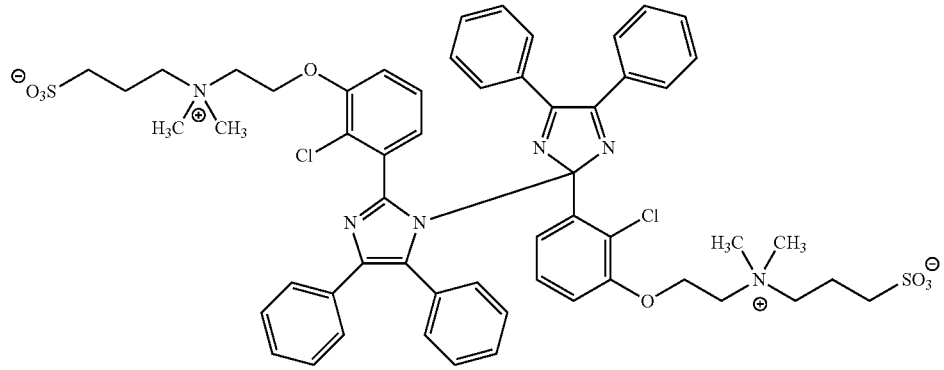
I-11
I-12
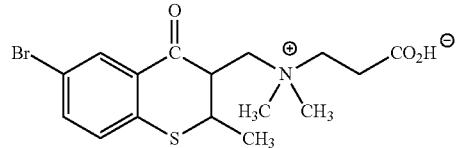

[Chem. 8]

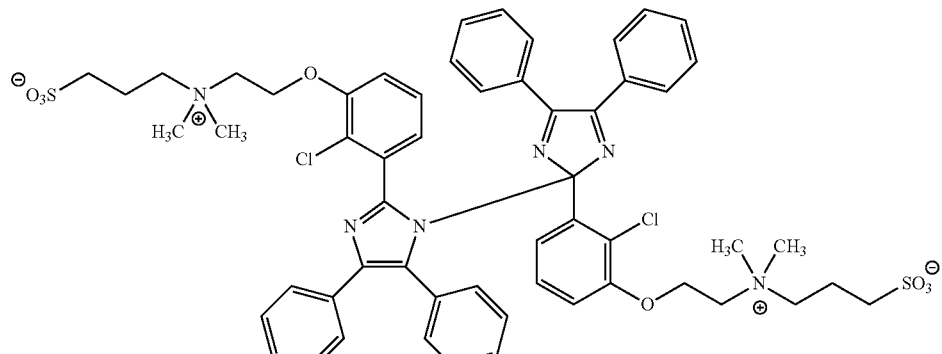

I-11

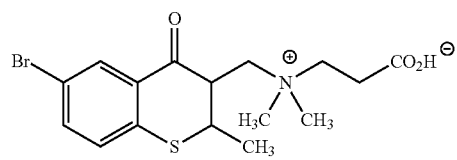

I-12

The photopolymerization initiators can be easily synthesized by acting a sultone, a lactone, or the like on a corresponding dimethylamine derivative (obtained by a well-known reaction such as a reaction between an alcohol body, a phenol body, or a thiophenone body and N,N-dimethylamino ethyl chloride or a reaction between a bromobenzyl body and dimethylamine).

The photopolymerization initiator contains at least one photopolymerization initiator having the betaine structure, and two or more kinds of photopolymerization initiators having the betaine structure may be jointly used, or a photopolymerization initiator having the betaine structure and a photopolymerization initiator not having the betaine structure may be jointly used. In this case, the photopolymerization initiator not having the betaine structure is preferably a compound represented by Formula (A) to (G) in which $R^{a1}$, $R^{a2}$, $R^{b1}$ to $R^{b6}$, $R^{c1}$, $R^{c2}$, $R^{e1}$, $R^{e2}$, $R^{d1}$, and $R^{d2}$ are not groups having the betaine structure.

The total content of the photopolymerization initiator is preferably in a range of 0.1 mass % to 40 mass %, more preferably in a range of 1 mass % to 30 mass %, and still more preferably in a range of 5 mass % to 20 mass % with respect to the total amount of the solid content in the curable resin composition, particularly, the ink composition.

In addition, the content of the photopolymerization initiator is preferably in a range of 0.1 parts by mass to 30 parts by mass, more preferably in a range of 1 part by mass to 20 parts by mass, and still more preferably in a range of 5 parts by mass to 15 parts by mass with respect to 100 parts by mass of the polymerizable compound having the ethylenic unsaturated group.

In the present invention, from the viewpoint of the suppression of volatilization and the improvement in the degree of solubility and sensitivity, the molecular weight of the photopolymerization initiator represented by Formula (A) is preferably in a range of 200 to 1500, more preferably in a range of 200 to 1000, and still more preferably in a range of 200 to 500.

In the present invention, from the viewpoint of the suppression of volatilization and the improvement in the degree of solubility and sensitivity, the molecular weight of the photopolymerization initiator represented by Formula (B) is preferably in a range of 200 to 1500, more preferably in a range of 200 to 1000, and still more preferably in a range of 200 to 600.

In the present invention, from the viewpoint of the suppression of volatilization and the improvement in the degree of solubility and sensitivity, the molecular weight of the photopolymerization initiator represented by Formula (C) is preferably in a range of 150 to 1500, more preferably in a range of 150 to 1000, and still more preferably in a range of 200 to 600.

In the present invention, from the viewpoint of the suppression of volatilization and the improvement in the degree of solubility and sensitivity, the molecular weight of the photopolymerization initiator represented by Formula (D) is preferably in a range of 600 to 2000, more preferably in a range of 600 to 1500, and still more preferably in a range of 600 to 1200.

In the present invention, from the viewpoint of the suppression of volatilization and the improvement in the degree of solubility and sensitivity, the molecular weight of the photopolymerization initiator represented by Formula (E) is preferably in a range of 250 to 1500, more preferably in a range of 250 to 1000, and still more preferably in a range of 250 to 600.

In the present invention, from the viewpoint of the suppression of volatilization and the improvement in the degree of solubility and sensitivity, the molecular weight of the photopolymerization initiator represented by Formula (F) is preferably in a range of 200 to 1500, more preferably in a range of 200 to 1000, and still more preferably in a range of 200 to 500.

In the present invention, from the viewpoint of the suppression of volatilization and the improvement in the degree of solubility and sensitivity, the molecular weight of the photopolymerization initiator represented by Formula (G) is preferably in a range of 250 to 1500, more preferably in a range of 250 to 1000, and still more preferably in a range of 250 to 800.

<Surfactant>
(Surfactant)

The ink composition or the treatment fluid in the present invention may include at least one surfactant. The surfactant can be used as a surface tension adjuster. Examples of the surface tension adjuster include nonionic surfactants, cationic surfactants, anionic surfactants, betaine surfactants, and the like. From the viewpoint of ink stability, nonionic surfactants and betaine surfactants are preferred.

As the specific examples of the surfactants, in hydrocarbon systems, an anionic surfactant such as a fatty acid salt, an alkyl sulfate ester salt, alkyl benzene sulfonate, an alkyl naphthalene sulfonic acid salt, a dialkyl sulfosuccinate salt, an alkyl phosphoric acid ester salt, a naphthalene sulfonic acid formalin condensate, or a polyoxyethylene alkyl sulfuric acid ester salt, or a nonionic surfactant such as polyoxyethylene alkyl ether, polyoxyethylene alkyl allyl ether, polyoxyethylene fatty acid ester, sorbitan fatty acid ester, polyoxyethylene sorbitan fatty acid ester, polyoxy ethylene alkylamine, glycerin fatty acid ester, or an oxyethylene oxypropylene block copolymer is preferred. In addition, SURFYNOLS (produced by Air Products and Chemicals, Inc.), which is an acetyl-based polyoxyethylene oxide surfactant, is also preferably used. In addition, an amineoxide-type ampholytic surfactant such as N,N-dimethyl-N-alkylamineoxide or an alkyl sulfobetaine-type ampholytic surfactant such as dimethylbenzyl ammonium propane sulfonate is also preferred.

Furthermore, it is possible to use the substances exemplified as the surfactant on pp. 37 and 38 in JP1984-157636A (JP-S59-157636A) and Researcher Disclosure No. 308119 (1989).

In addition, examples of the surfactant also include the fluorine (alkyl fluoride)-based surfactants, silicone-based surfactants, and the like described in JP2003-322926A, JP2004-325707A, and JP2004-309806A.

The content of the surfactant in the ink composition or the treatment fluid is not particularly limited, but a content at which the surface tension reaches 40 mN/m or more is preferred, a content at which the surface tension reaches 40 mN/m to 60 mN/m is more preferred, and a content at which the surface tension reaches 42 mN/m to 50 mN/m is still more preferred.

<Water>

The curable resin composition of the present invention includes water. The water being used is preferably water containing no ionic impurities such as ion exchange water or distilled water.

The content of water can be appropriately selected depending on the purpose, and is preferably in a range of 10 mass % to 95 mass %, and more preferably in a range of 30 mass % to 90 mass % with respect to the total mass of the curable resin composition, particularly, the ink composition.

<Others>

In addition to the above-described components, the curable resin composition of the present invention may include, as necessary, an organic solvent, for example, a water-soluble solvent (an alcohol compound such as methanol or ethanol, a ketone compound such as acetone or methyl ethyl ketone, an amid compound such as dimethyl formaldehyde, a nitrile compound such as acetonitrile, a sulfo compound such as sulfolane, or the like), an antioxidant, an ultraviolet absorber, a sensitizing dye, a surfactant, a color tone adjuster, a viscosity improver, an antibacterial agent, a pH adjuster, a rust inhibitor, an emulsification stabilizer, a preservative, a defoamer, a viscosity adjuster, a dispersion stabilizer, a chelating agent, a solid wetting agent, an organic or inorganic salt, and the like.

Examples of the ultraviolet absorber include a benzophenone-based ultraviolet absorber, a benzotriazole-based ultraviolet absorber, a salicylate-based ultraviolet absorber, a cyanoacrylate-based ultraviolet absorber, a nickel complex-based ultraviolet absorber, and the like.

As the antioxidant, it is possible to use a variety of organic and metal complex-based discoloration preventers. Examples of the organic discoloration preventer include hydroquinones, alkoxyphenols, dialkoxyphenols, phenols, anilines, amines, indanes, chromanes, alkoxyanilines, hetero rings, and the like. Examples of the metal complex-based discoloration preventer include nickel complexes, zinc complexes, and the like.

Examples of the antibacterial agent include sodium dehydroacetate, sodium benzoate, sodium pyridinethione-1-oxide, p-hydroxy ethyl benzoate ester, 1,2-benzisothiazoline-3-on, sodium sorbate, pentachlorophenol sodium, and the like. The ink composition preferably includes the antibacterial agent in a range of 0.02 mass % to 1.00 mass %.

There is no particular limitation regarding the pH adjuster as long as the pH adjuster has no adverse influence on a curable composition to be adjusted, and is capable of adjusting the pH to a desired value. Examples thereof include alcoholamines (for example, diethanolamine, triethanolamine, 2-amino-2-ethyl-1,3-propandiol, and the like), alkali metal hydroxides (for example, lithium hydroxide, sodium hydroxide, potassium hydroxide, and the like), ammonium hydroxides (for example, ammonium hydroxide, quaternary ammonium hydroxide, and the like), phosphonium hydroxide, alkali metal carbonate, and the like.

Examples of the rust inhibitor include acid sulfite, sodium thiosulfate, ammonium thioglycolate, diisopropyl ammonium nitrite, pentaerythritol tetranitrate, dicyclohexyl ammonium nitrite, and the like.

Examples of the antioxidant include phenol-based antioxidants (including hindered phenol-based antioxidants), amine-based antioxidants, sulfur-based antioxidants, phosphorous-based antioxidants, and the like.

Examples of the chelating agent include sodium ethylenediaminetetraacetate, sodium nitrilotri acetate, sodium hydroxyethylethylenediaminetriacetate, sodium diethylenetriaminepentaacetate, sodium uramildiacetate, and the like.

[Properties of the Curable Resin Composition]

The surface tension (25° C.) of the curable resin composition of the present invention, particularly, the ink composition is preferably in a range of 20 mN/m to 60 mN/m, more preferably in a range of 20 mN/m to 45 mN/m, and still more preferably in a range of 25 mN/m to 40 mN/m.

The surface tension is measured using an automatic surface tensiometer CBVP-Z (manufactured by Kyowa Interface Science Co., Ltd.) under a condition in which the ink composition is at 25° C.

The viscosity at 25° C. is preferably in a range of 1.2 mPa·s to 15.0 mPa·s, more preferably in a range of 2 mPa·s to less than 13 mPa·s, and still more preferably in a range of 2.5 mPa·s to less than 10 mPa·s.

The viscosity is measured using a VISCOMETER TV-22 (manufactured by Told Sangyo Co., Ltd.) under a condition of 25° C.

From the viewpoint of the stability of the curable resin composition, particularly, the ink composition, the pH is preferably in a range of 6 to 11. In a case in which an ink set described below is produced, the ink composition preferably aggregates at a high rate when coming into contact with the treatment fluid, and therefore the pH is more preferably in a range of 7 to 10, and still more preferably in a range of 7 to 9.

<<Ink Set>>

An ink set of the present invention is made up of a part of the ink composition (hereinafter, referred to as the ink composition A) which is the above-described curable resin composition of the present invention and a part of an ink composition B which is the treatment fluid containing an aggregating agent that is capable of forming an aggregate when coming into contact with the ink composition A.

When an image is formed using the ink composition A and the treatment fluid containing an aggregating agent, it is possible to form an image which has favorable image qualities, high curing sensitivity, and excellent blocking resistance.

Hereinafter, the treatment fluid for the ink set will be described.

<Treatment Fluid (Acidic Ink Composition B)>

The acidic ink composition B (hereinafter, simply referred to as the treatment fluid) which is the treatment fluid for the ink set preferably includes an acidic compound that aggregates components in the ink composition, and may include other components as necessary.

[Acidic Compound]

In the present invention, the acid compound preferably has a molecular weight in a range of 50 to 200, and pKa (25° C.) in a range of 1 to 5 in water.

The acidic compound used in the treatment fluid is capable of aggregating (immobilizing) the ink composition when coming into contact with the ink composition on a recording medium, and functions as an immobilizing agent. For example, in a state in which an aggregating agent is provided on a recording medium (preferably coated paper) by supplying the treatment fluid to the recording medium, when the ink composition further lands and comes into contact with the aggregating agent, the components in the ink composition aggregate, and thus the ink composition can be immobilized onto the recording medium.

Preferable examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyronecarboxylic acid, pyrrolecarboxylic acid, furancarboxylic acid, pyridinecarboxylic acid, coumaric acid, thiophenecarboxylic acid, nicotinic acid, oxalic acid, acetic acid, benzoic acid, derivatives thereof, salts thereof, and the like. From the viewpoint of satisfying both the suppression of volatilization and the degree of solubility in a solvent, the molecular weight of the acidic compound is preferably in a range of 50 to 1000, more preferably in a range of 50 to 500, and particularly preferably in a range of 50 to 200, and in the ink set of the present invention, an acidic compound having a molecular weight in a range of 50 to 200 is used. From the viewpoint of satisfying both the prevention of ink bleeding and photocuring properties, an acidic compound having pKa (in $H_2O$) in a range of −10 to 7 is preferred, an acidic compound having pKa in a range of 1 to 7 is more preferred, and an acidic compound having pKa in a range of 1 to 5 is particularly preferred, and in the ink set of the present invention, an acidic compound having pKa in a range of 1 to 5 is used.

Among them, a highly water-soluble acidic compound is preferred. In addition, from the viewpoint of immobilizing all the ink through a reaction with the ink composition, a trivalent or lower acidic compound is preferred, and a divalent or trivalent acidic compound is particularly preferred.

The acidic compound may be singly used, or two or more acidic compounds may be jointly used.

In a case in which the treatment fluid includes the acidic compound, the pH (25° C.) of the treatment fluid is preferably in a range of 0.1 to 6.8, more preferably in a range of 0.5 to 6.0, and still more preferably in a range of 0.8 to 5.0.

The content of the acidic compound is preferably 40 mass % or less, more preferably in a range of 15 mass % to 40 mass %, still more preferably in a range of 15 mass % to 35 mass %, and particularly preferably in a range of 20 mass % to 30 mass % with respect to the total mass of the treatment fluid. When the content of the acidic compound is set in a range of 15 mass % to 40 mass %, it is possible to more efficiently immobilize the components in the ink composition.

The amount of the acid compound supplied to a recording medium is not particularly limited as long as the ink composition is aggregated; however, from the viewpoint of ease of immobilizing the ink composition, the amount is preferably in a range of 0.5 $g/m^2$ to 4.0 $g/m^2$, and more preferably in a range of 0.9 $g/m^2$ to 3.75 $g/m^2$.

[Cationic Polymer]

A cationic polymer is preferably at least one cationic polymer selected from poly(vinylpyridine) salts, polyalkylaminoethylacrylate, polyalkylaminoethylmethacrylate, poly(vinylimidazole), polyethylenimine, polybiguanide, and polyguanide.

Among the cationic polymers, polyguanide (preferably poly(hexamethylene guanidine)acetate, polymonoguanide, polymeric biguanide), polyethylene imine, or poly(vinyl pyrridine), which are advantageous from the viewpoint of the aggregation rate, is preferred.

The cationic polymer may be singly used, or two or more cationic polymers may be jointly used.

The mass average molecular weight of the cationic polymer is preferably small from the viewpoint of the viscosity of the treatment fluid. In a case in which the treatment fluid is supplied to a recording medium by the ink jet method, the mass average molecular weight is preferably in a range of 500 to 500,000, more preferably in a range of 700 to 200,000, and still more preferably in a range of 1,000 to 100,000. The mass average molecular weight is advantageously 500 or more from the viewpoint of the aggregation rate, and is advantageously 500,000 or less from the viewpoint of the discharge reliability. In a case in which the treatment fluid is supplied to a recording medium using a method other than the ink jet, what has been described above shall not apply.

The treatment fluid includes the cationic polymer, and the pH (25° C.) of the treatment fluid is preferably in a range of 1.0 to 10.0, more preferably in a range of 2.0 to 9.0, and still more preferably in a range of 3.0 to 7.0.

The content of the cationic polymer is preferably in a range of 1 mass % to 35 mass %, and more preferably in a range of 5 mass % to 25 mass % with respect to the total mass of the treatment fluid.

The amount of the cationic polymer supplied to coated paper is not particularly limited as long as the ink composition is stabilized; however, from the viewpoint of ease of immobilizing the ink composition, the amount is preferably in a range of 0.5 $g/m^2$ to 4.0 $g/m^2$, and more preferably in a range of 0.9 $g/m^2$ to 3.75 $g/m^2$.

<<Photocuring Method>>

A photocuring method of the present invention is preferably a method in which the resin composition is photocured by combining the ink composition (A) and the treatment fluid [ink composition (B)], and is particularly preferably a method in which the resin composition is cured under acidic conditions.

The acidic conditions refer to a fact that, when the ink composition is cured, the environment of the ink composition or an environment in which the ink composition is cured is an acidic condition, and as in the ink set described above, the ink composition may be combined with another ink composition B.

In addition, the ink-receiving surface of a recording medium may be turned into an acidic state using the ink composition B, or a recording medium having an ink-receiving surface that has been in an acidic state in advance may be used.

During the photocuring, an active energy ray radiation step described below is preferably applied.

<<Image-Forming Method>>

In an image-forming method of the present invention, the ink composition (ink composition A) or the above-described photocuring method is used in an image-forming phase, and the ink composition combined with a coloring agent may be used as a color image-forming ink composition.

The image-forming method of the present invention preferably includes at least an acid treatment step of supplying the ink composition B of the treatment fluid, which is a part of the ink set, onto a recording medium (treatment fluid supply step), an ink supply step of supplying the ink composition A onto the acid-treated recording medium, and a photocuring step (active energy ray radiation step) of curing the ink in a formed image through light radiation. In addition, the image-forming method may further include other steps as necessary.

[Recording Medium]

There is no particular limitation regarding the recording medium used in the image-forming method of the present invention, and it is possible to use ordinary printing paper which is used for ordinary offset printing and the like and includes cellulose as a main body, such as so-called high-quality paper, coated paper, and art paper. On ordinary printing paper including cellulose as a main body, when an image is recorded using an ordinary ink jet method in which an aqueous ink is used, the absorption and drying of ink is relatively slow, the transfer of a color material is likely to occur after the striking of ink, and the image qualities are likely to degrade. However, when an image is recorded using the ink jet recording method of the present invention, the transfer of a color material is suppressed, and a high-quality image having excellent color density and color tone can be recorded.

Commercially available ordinary paper can be used as the recording medium, and examples thereof include "OK Prince High Quality" manufactured by Oji Paper Co., Ltd., "SHIRAOI" manufactured by Nippon Paper Industries Co., Ltd., high-quality paper (A) such as "NEW NPI High Quality" manufactured by Nippon Paper Industries Co., Ltd., high-quality coated paper such as "SILVER DIAMOND" manufactured by Nippon Paper Industries Co., Ltd., fine coated paper such as "OK EVERLIGHT COAT" manufactured by Oji Paper Co., Ltd. and "AURORA S" manufactured by Nippon Paper Industries Co., Ltd., light-weight coated paper (A3) such as "OK COAT L" manufactured by Oji Paper Co., Ltd. and "AURORA L" manufactured by Nippon Paper Industries Co., Ltd., coated paper (A2, B2) such as "OK TOP COAT+" manufactured by Oji Paper Co., Ltd. and "AURORA COAT" manufactured by Nippon Paper Industries Co., Ltd., art paper (A1) such as "OK KANETO+" manufactured by Oji Paper Co., Ltd. and "TOKUBISHI ART" manufactured by Mitsubishi Paper Mills Limited, and the like. In addition, it is also possible to use a variety of photographic paper for ink jet recording.

Among them, from the viewpoint of having a strong effect that suppresses the transfer of a color material and the obtainment of a high-quality image having more favorable color density and color tone than before, the water absorption coefficient Ka of the recording medium is preferably in a range of $0.05$ $mL/m^2 \cdot ms^{1/2}$ to $0.5$ $mL/m^2 \cdot ms^{1/2}$, more preferably in a range of $0.1$ $mL/m^2 \cdot ms^{1/2}$ to $0.4$ $mL/m^2 \cdot ms^{1/2}$, and still more preferably in a range of $0.2$ $mL/m^2 \cdot ms^{1/2}$ to $0.3$ $mL/m^2 \cdot ms^{1/2}$.

The water absorption coefficient Ka is identical to that described in JAPAN TAPPI's paper and pulp testing method No. 51:2000 (published by JAPAN TAPPI), and specifically, the absorption coefficient Ka is computed from the difference in the amount of water transferred between a contact duration 100 ms and a contact duration 900 ms using an automatic scanning absorptometer KM500Win (manufactured by Kumagai Riki Kogyo Co., Ltd.).

Among the recording media, so-called coated paper, which is used for ordinary offset printing, is preferred. The coated paper is paper obtained by applying a coating material to the surface of high-quality paper, alkaline paper, or the like, which includes cellulose as a main body, and is, generally, not subjected to a surface treatment, thereby providing a coated layer. The coated paper is likely to cause a problem in terms of quality such as the luster or wear resistance of an image in the formation of the image by an ordinary aqueous ink jet; however, in a case in which the above-described ink composition or ink set is used, luster variation is suppressed, and an image having favorable shine properties and scratch resistance can be obtained. Particularly, coated paper including base paper and a coated layer including kaolin and/or heavy calcium bicarbonate is preferably used. More specifically, art paper, coated paper, light-weight coated paper, or fine coated paper is more preferred.

[Acid Treatment Step (Treatment Fluid Supply Step)]

In the treatment fluid supply step, the treatment fluid containing an aggregating agent included in the ink set is supplied onto the recording medium. For the supply of the treatment fluid to the recording medium, a well-known liquid supply method can be used with no particular limitation, and it is possible to select an arbitrary method such as spray coating, coating by a coating roller or the like, supply by the ink jet method, or immersion.

Specific examples thereof include size press methods represented by a horizontal size press method, a roll coater method, a calendar size press method, and the like; size press methods represented by an air knife coater method and the like; a knife coater method represented by an air knife coater method and the like; transfer roll coater methods such as a gate roll coater method and the like, roll coater methods represented by a direct roll coater method, a reverse roll coater method, a squeeze roll coater method, or the like; a bill blade coater method, and a short dwell coater method; blade coater methods represented by a two stream coater method and the like; bar coater methods represented by a rod bar coater method and the like; bar coater methods represented by a rod bar coater method and the like; cast coater methods; gravure coater methods; curtain coater methods; die coater methods; brush coater methods; transfer methods, and the like.

In addition, it is also possible to use a method in which the treatment fluid is applied by controlling the coating amount using a coating apparatus equipped with a liquid amount restriction member such as the coating apparatus described in JP1998-230201A (JP-H10-230201A).

Regarding the region in which the treatment fluid is supplied, the supply may be full-surface supply in which the treatment fluid is supplied to the entire recording medium or partial supply in which the treatment fluid is partially supplied to regions in which the ink is supplied in the ink supply step. In the present invention, from the viewpoint of uniformly adjusting the amount of a treatment fluid supplied, homogeneously recording fine lines, fine image portions, or the like, and suppressing the density variation such as image variation, the full-surface supply in which the treatment fluid is supplied to the entire coated paper through coating in which a coating roller or the like is used is preferred.

Examples of a method for applying the treatment fluid by controlling the amount of the treatment fluid supplied within the above-described range include a method in which an anilox roller is used. The anilox roller refers to a roller provided with pyramid shapes, diagonal lines, tortoiseshell shapes, or other shapes by processing the surface of a roller on which ceramic has been sprayed using a laser. The treatment fluid permeates into recess portions provided on the roller surface, and is transferred to a paper surface when coming into contact with the paper surface, thereby applying a controlled coating amount in the recesses of the anilox roller.

—Ink Supply Step—

In the ink supply step, the ink composition included in the ink set is supplied onto the recording medium. There is no particular limitation regarding the method for supplying the ink composition as long as the ink composition can be supplied in a desired image pattern, and a well-known ink supply method can be used. For example, the ink composition can be supplied onto the recording medium using means of the ink jet method, a mimeographing method, a stamping method, or the like. Among them, from the viewpoint of compacting a recording apparatus and high-speed recording properties, a step of supplying the ink composition using the ink jet method is preferred.

[Ink Jet Method]

In the formation of an image using the ink jet method, the ink composition is discharged onto the recording medium by supplying energy, and a colored image is formed. Meanwhile, as a preferable ink jet recording method for the present invention, the method described in paragraphs 0093 to 0105 in JP2003-306623A can be applied.

The ink jet method is not particularly limited, and may be a well-known method, for example, any of a charge control method in which ink is discharged using an electrostatic attracting force, a drop-on-demand method (a pressure pulse method) in which a vibration pressure of a piezo element is used, an acoustic ink jet method in which ink is discharged using radiation pressure by converting an electric signal to an acoustic beam, and radiating the acoustic beam on the ink, and the like.

In addition, an ink jet head used in the ink jet method may be any of an on-demand method and a continuous method. Furthermore, an ink nozzle and the like used when recording is carried out using the ink jet method are not particularly limited, and can be appropriately selected depending on the purpose.

The scope of the ink jet method includes a method in which a number of small volumes of ink having a low concentration called photo ink are sprayed, a method in which image qualities are improved using a plurality of inks having substantially the same color tone and different concentrations, and a method in which colorless and transparent ink is used.

As the ink jet method, there are a shuttle method in which recording is carried out using a short serial head while the serial head is scanned in the width direction of a recording medium and a line method in which a line head in which recording elements are arrayed fully corresponding to one side of a recording medium is used. In the line method, an image can be recorded on the entire surface of a recording medium by scanning the recording medium in a direction orthogonal to the array direction of the recording elements, and a transportation system such as a carriage that scans the short head becomes unnecessary. In addition, the movement of the carriage and the complicated scanning control with a recording medium become unnecessary, and only the recording medium is moved, and therefore the recording speed can be increased compared with the shuttle method.

In the present invention, there is no particular limitation regarding the order of the acid treatment step and the ink supply step; however, from the viewpoint of image quality, it is preferable to carry out the ink supply step after the acid treatment step. That is, the ink supply step is preferably a step of supplying the ink composition onto the recording medium onto which the acid treatment agent has been supplied.

[Active Energy Ray Radiation Step]

In the image-forming method of the present invention, a step of radiating an active energy ray on the ink composition supplied onto the recording medium is preferably included. When an active energy ray is radiated, the polymerizable compound included in the ink composition is polymerized, and a cured film including the colorant is formed. As a result, the scratch resistance and blocking resistance of an image are more effectively improved.

The ink composition supplied onto the recording medium is cured when being irradiated with an active energy ray. This is because the photopolymerization initiator included in the ink composition is decomposed by the radiation of the active energy ray, a radical is generated, and the polymerization reaction of the polymerizable compound is initiated and accelerated by the generated radical, whereby the ink composition is cured.

In a case in which an acid is included in the treatment fluid, the ink composition is further aggregated (immobilized) by the acid supplied from the compound when the active energy ray is radiated, and the qualities of an image section (scratch resistance, blocking resistance, and the like) improve.

In the present invention, as the active energy ray, an $\alpha$ ray, a $\gamma$ ray, an electron beam, an X ray, an ultraviolet ray, a visible ray, an infrared ray, and the like can be used. As described above, the photopolymerization initiator used in the present invention strongly absorbs, particularly, light in the ultraviolet range, and therefore the wavelength of the active energy ray is preferably in a range of 200 nm to 600 nm, more preferably in a range of 300 nm to 450 nm, and still more preferably in a range of 350 nm to 420 nm.

The output of the active energy ray is preferably 5000 mJ/cm² or less, more preferably in a range of 10 mJ/cm² to 4000 mJ/cm², and still more preferably in a range of 20 mJ/cm² to 3000 mJ/cm².

As an active energy ray source, a mercury lamp, a gas or solid laser, and the like are mainly used, and, as a light source used for the curing of ink for ultraviolet photo-curing ink jet recording, a mercury lamp or a metal halide lamp is widely known. However, currently, there is a strong demand for the removal of mercury from the viewpoint of environmental protection, and the substitution into a GaN-based semiconductor ultraviolet light-emitting device is extremely useful in terms of industrial and environmental senses. In addition, an LED and an LD are small and inexpensive, and have performance of a long service life and high efficiency, and therefore they are expected as light sources for a photo-curing ink jet.

In the present invention, a light emitting diode (LED) and a laser diode (LD) can be used as the active energy ray source. Particularly, an ultraviolet LED (UV-LED) and an ultraviolet LD (UV-LD) can be used as an ultraviolet ray source. For example, Nichia Corporation sells a purple LED in which the main emission spectrum has a wavelength between 365 nm and 420 nm.

A particularly preferable active energy ray source in the present invention is a UV-LED, and a UV-LED having a peak wavelength in a range of 350 nm to 420 nm is preferred.

[Ink-Drying Step]

The image-forming method of the present invention may include, if necessary, an ink-drying step in which the solvent (for example, water, the above-described aqueous medium, or the like) in the ink composition supplied onto the recording medium is dried and removed. The ink-drying step is not particularly limited as long as at least a part of the ink solvent can be removed, and it is possible to apply a generally-used method.

[Curable Resin Composition for Usages Other than the Ink Composition]

In addition to the ink composition, the curable resin composition of the present invention is useful as a curable resin composition that cures a variety of resins.

Particularly, the curable resin composition of the present invention contains water, and thus is used as a water-soluble or emulsion-based curable resin composition.

Examples thereof include paint, adhesives, gluing agents, functional coating agents, a variety of coats, a variety of films, optical materials, printing plate materials, semiconductor materials, recording materials, tissue culturing plates, paper additives, medical materials, plastic, water retention agents, water absorption agents, hydrophilic members, and the like.

More specific examples thereof include antireflection layers in a variety of films, base coat adhesive layers in a variety of films, coating layers in a variety of films, resists, press plates, color filters, endoscope coating agents, ion-exchange membranes, reverse osmosis membranes, conductive coated films, medical adhesives, proton-conducting membranes, micropore films, and the like.

EXAMPLES

Hereinafter, the present invention will be described in more detail on the basis of examples, but the present invention is not limited to these examples.

Example 1

Preparation of a Polymerizable Compound

[Chem. 9]

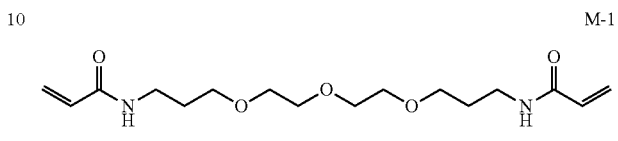

[Synthesis of Polymerizing Compound M-1]

40.0 g (182 mmol) of 4,7,10-trioxa-1,13-tridecanediamine, 37.8 g (450 mmol) of sodium hydrogen carbonate, 100 g of water, and 200 g of tetrahydrofuran were added to a 1 L three neck flask including a stirrer. 35.2 g (389 mmol) of acrylic acid chloride was added dropwise to the mixture for 20 minutes in an ice bath, and the solution was stirred at room temperature for five hours after the dropwise addition. Tetrahydrofuran was distilled away from the obtained reaction mixture at reduced pressure. Next, a product was extracted from a water layer four times using 200 ml of ethyl acetate, the obtained organic layer was dried using magnesium sulfate, and then was filtered, and a solvent was distilled away at reduced pressure, thereby obtaining 35.0 g (107 mmol, yield 59%) of target solid Polymerizing Compound M-2.

[Preparation of Photopolymerization Initiator]

[Synthesis of Photopolymerization Initiator I-1]

Photopolymerization Initiator I-1 was synthesized using 3-methoxythioxanthone synthesized using the method described in Synlett, 16, 2453 (2005) as a starting material with reference to J. Am. Chem. Soc., 111, 224 (1989) according to Scheme 1 described below.

Scheme 1

[Chem. 10]

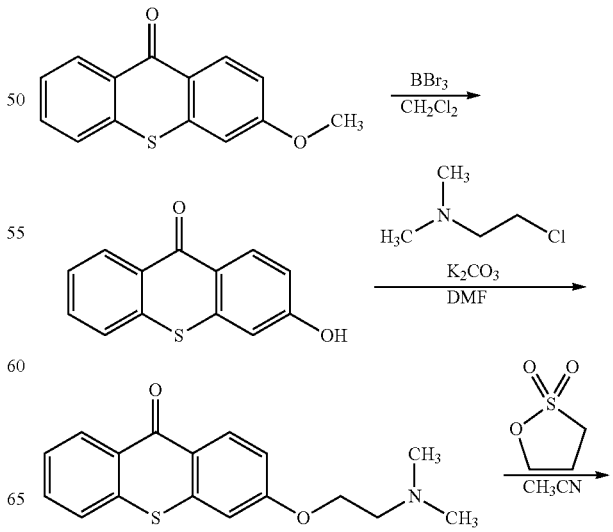

-continued

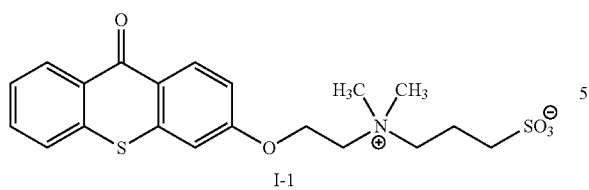

I-1

[Synthesis of Photopolymerization Initiator I-2]

Photopolymerization Initiator I-2 was synthesized with reference to the specification of U.S. Pat. No. 234,485A and Tetrahedron, 67, 7763 (2011) according to Scheme 2 described below.

Scheme 2

[Chem. 11]

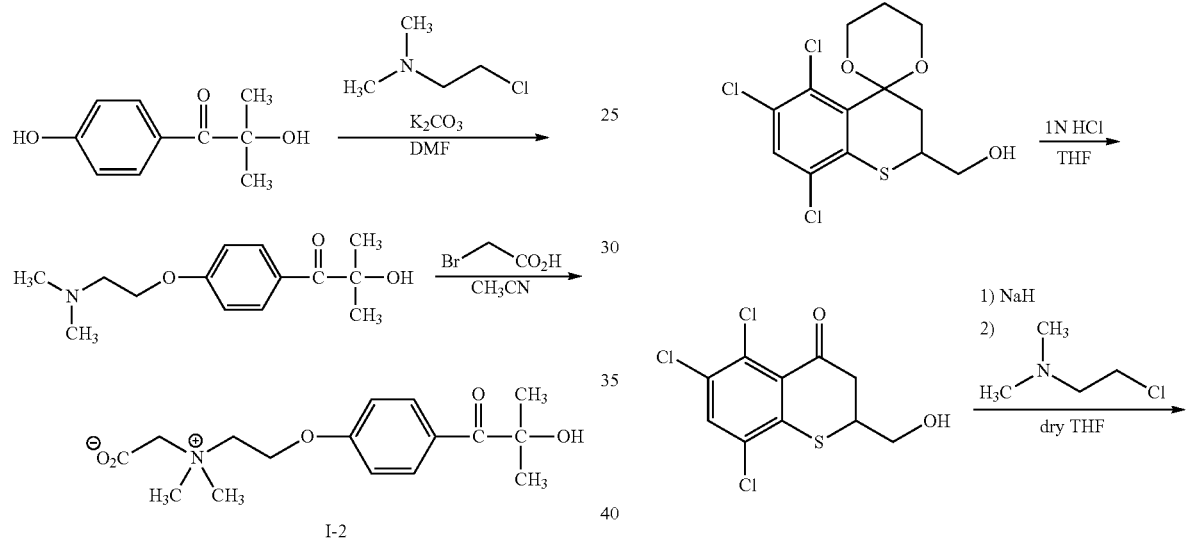

I-2

[Synthesis of Photopolymerization Initiator I-5]

Photopolymerization Initiator I-5 was synthesized with reference to JP2009-84220A according to the following scheme.

Scheme 3

[Chem. 12]

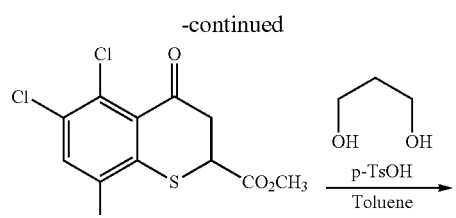

-continued

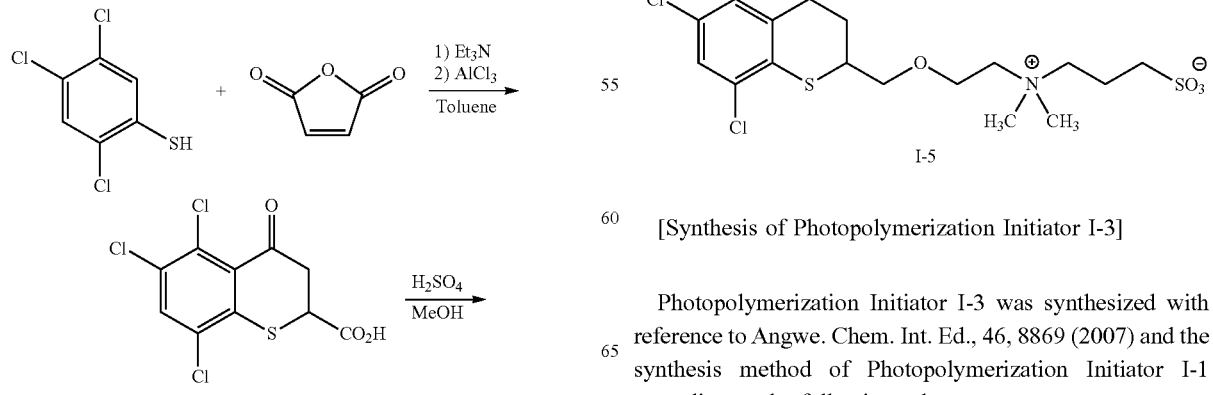

I-5

[Synthesis of Photopolymerization Initiator I-3]

Photopolymerization Initiator I-3 was synthesized with reference to Angwe. Chem. Int. Ed., 46, 8869 (2007) and the synthesis method of Photopolymerization Initiator I-1 according to the following scheme.

Scheme 4

[Chem. 13]

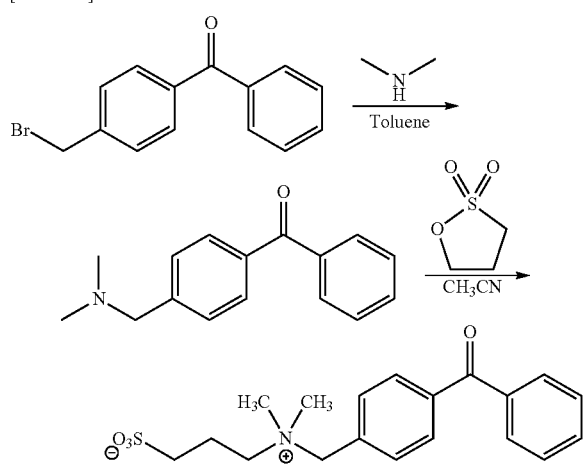

[Synthesis of Photopolymerization Initiator I-8]

Photopolymerization Initiator I-8 was synthesized with reference to the specification of U.S. Pat. No. 4,190,602A and the synthesis method of Photopolymerization Initiator I-1 according to the following scheme.

Scheme 5

[Chem. 14]

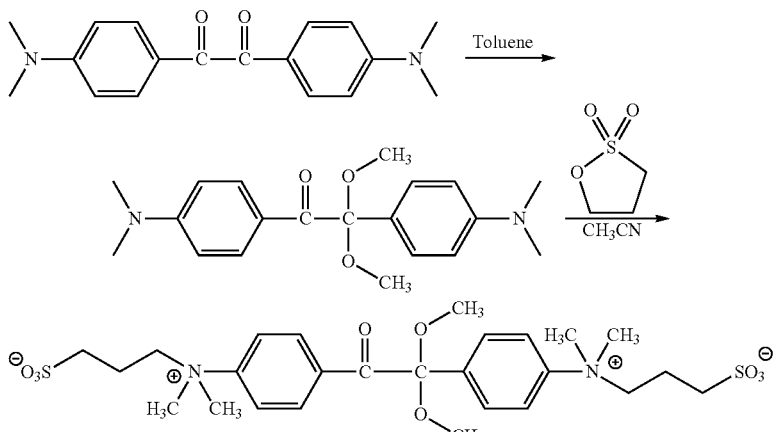

[Synthesis of Photopolymerization Initiator I-4]

Photopolymerization Initiator I-4 was synthesized with reference to J. Am. Chem. Soc., 131, 4227 (2009) and the synthesis method of Photopolymerization Initiator I-1 according to the following scheme.

[Chem. 15]

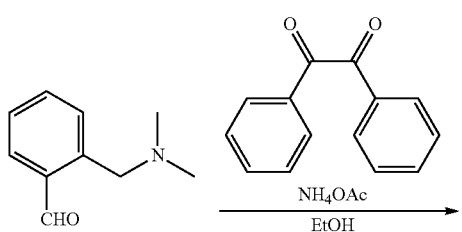

Preparation of Comparative Example Compounds

Comparative Example Compound R-1 was produced by BASF Japan Ltd. Comparative Example Compounds R-2 and R-4 were synthesized according to JP2012-7071A and Chem. Mater., 10, 3429 (1998). Comparative Example Compound R-3 was synthesized according to JP2008-247939A.

[Chem. 16]

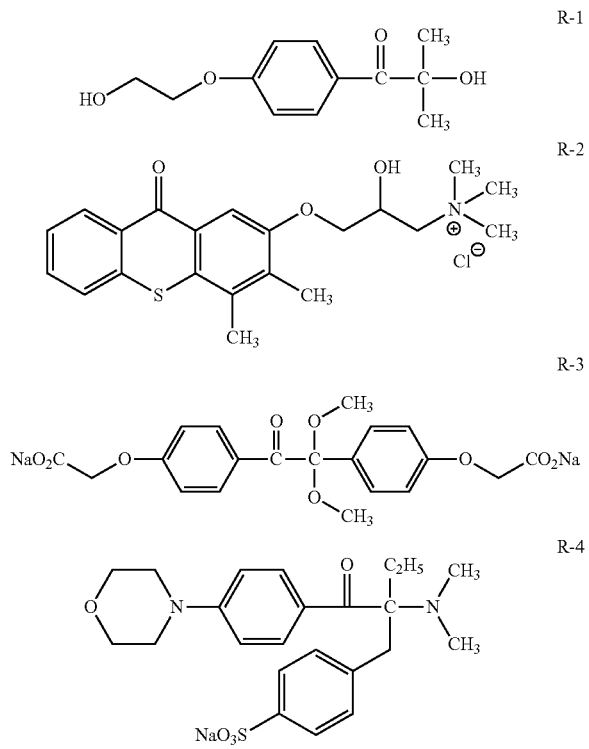

[Synthesis of Polymer Dispersing Agent P-1]

88 g of methyl ethyl ketone was added to a 1000 ml three neck flask including a stirrer and a cooling pipe, was heated at 72° C. in a nitrogen atmosphere, and a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added dropwise to the methyl ethyl ketone for three hours. After the dropwise addition, the components were further reacted for one hour, then, a solution obtained by dissolving 0.42 g of dimethyl 2,2'-azobisisobutyrate in 2 g of methyl ethyl ketone was added, and was heated at 78° C. for four hours. The obtained reaction solution was re-precipitated twice in an extremely excessive amount of hexane, and the reduced resin was dried, thereby obtaining 96 g of Polymer Dispersing agent P-1.

The composition of the obtained resin was confirmed through $^1$H-NMR, and the mass-average molecular weight (Mw) obtained through gel permeation chromatography (GPC) was 44,600. Furthermore, as a result of obtaining the acid value using the method described in JIS standards (JISK0070:1992), the acid value was 65.2 mgKOH/g.

[Preparation of a Resin-Coated Pigment-Dispersion]

—Resin-Coated Magenta Pigment Dispersion—

10 parts by mass of Chromophthal Jet Magenta DMQ (Pigment Red 122, manufactured by BASF Japan Ltd.), 5 parts by mass of Polymer Dispersing agent P-1, 42 parts by mass of methyl ethyl ketone, 5.5 parts by mass of an aqueous solution of 1 mol/L NaOH, and 87.2 parts by mass of ion exchange water were mixed together, and were dispersed for two hours to six hours using a beads mill in which 0.1 mmϕ zirconia beads were used.

Methyl ethyl ketone was removed from the obtained dispersed substance at reduced pressure at 55° C., and furthermore, some of the water was removed, thereby obtaining a resin-coated magenta pigment dispersion (coloring particles) having a pigment concentration of 10.2 mass %.

[Preparation of Ink Sets 1 to 7 and Comparative Ink Sets c1 to c6]

Magenta Inks 1 to 7, Comparative Magenta Inks c1 to c6, and Treatment Fluids 1 and 2 were respectively prepared as described below, and Ink Sets 1 to 5 and 7, and Comparative Inks Sets c1 to c6, which were combinations of the respective ink compositions of Magenta Inks 1 to 5 and 7 and Comparative Magenta Inks c1 to c6, and Treatment Fluid 1, were obtained. In addition, Ink Set 6, which was a combination of Magenta Ink 6 and Treatment Fluid 2, was obtained.

(Preparation of Magenta Inks 1 to 7)

As described below, a resin-coated magenta pigment dispersion, ion exchange water, a photopolymerization initiator, a polymerizable compound, and a surfactant were mixed using the resin-coated magenta pigment dispersion, and then the mixture was filtered using a 5 μm membrane filter, thereby preparing Magenta Inks 1 to 4 and Comparative Magenta Inks c1 to c6.

—Preparation of Magenta Ink 1—

| Resin-coated magenta pigment dispersion | 6 mass % |
|---|---|
| Compound I-1 (water-soluble photo-polymer initiator) | 1 mass % |
| N-methyl diethanolamine (produced by Tokyo Chemical Industry Co., Ltd.) | 1 mass % |
| Polymerizing Compound M-1 | 15 mass % |
| Olefin E1010 (produced by Nissin Chemical Co., Ltd.; surfactant) | 1 mass % |
| Ion exchange water | added so that the total amount reached 100 mass % |

—Preparation of Magenta Ink 2—

| Resin-coated magenta pigment dispersion | 6 mass % |
|---|---|
| Compound I-2 (water-soluble photo-polymer initiator) | 2 mass % |
| Polymerizing Compound M-1 | 15 mass % |
| Olefin E1010 (produced by Nissin Chemical Co., Ltd.; surfactant) | 1 mass % |
| Ion exchange water | added so that the total amount reached 100 mass % |

—Preparation of Magenta Ink 3—

| Resin-coated magenta pigment dispersion | 6 mass % |
|---|---|
| Compound I-5 (water-soluble photo-polymer initiator) | 1 mass % |
| N-methyl diethanolamine (produced by Tokyo Chemical Industry Co., Ltd.) | 1 mass % |
| Polymerizing Compound M-1 | 15 mass % |
| Olefin E1010 (produced by Nissin Chemical Co., Ltd.; surfactant) | 1 mass % |
| Ion exchange water | added so that the total amount reached 100 mass % |

—Preparation of Magenta Ink 4—

| | |
|---|---|
| Resin-coated magenta pigment dispersion | 6 mass % |
| Compound I-3 (water-soluble photo-polymer initiator) | 1 mass % |
| N-methyl diethanolamine (produced by Tokyo Chemical Industry Co., Ltd.) | 1 mass % |
| Polymerizing Compound M-l | 15 mass % |
| Olefin E1010 (produced by Nissin Chemical Co., Ltd.; surfactant) | 1 mass % |
| Ion exchange water | added so that the total amount reached 100 mass % |

—Preparation of Magenta Ink 5—

| | |
|---|---|
| Resin-coated magenta pigment dispersion | 6 mass % |
| Compound I-8 (water-soluble photo-polymer initiator) | 2 mass % |
| Polymerizing Compound M-1 | 15 mass % |
| Olefin E1010 (produced by Nissin Chemical Co., Ltd.; surfactant) | 1 mass % |
| Ion exchange water | added so that the total amount reached 100 mass % |

—Preparation of Magenta Ink 6—

| | |
|---|---|
| Resin-coated magenta pigment dispersion | 6 mass % |
| Compound I-4 (water-soluble photo-polymer initiator) | 2 mass % |
| Polymerizing Compound M-1 | 15 mass % |
| Olefin E1010 (produced by Nissin Chemical Co., Ltd.; surfactant) | 1 mass % |
| Ion exchange water | added so that the total amount reached 100 mass % |

—Preparation of Magenta Ink 7—

| | |
|---|---|
| Resin-coated magenta pigment dispersion | 6 mass % |
| Compound I-1 (water-soluble photo-polymer initiator) | 1 mass % |
| N-methyl diethanolamine (produced by Tokyo Chemical Industry Co., Ltd.) | 1 mass % |
| Polymerizing Compound M-1 | 15 mass % |
| NDSB-256 (produced by Wako Pure Chemical Industries, Ltd.; betaine-type surfactant) | 1 mass % |
| Ion exchange water | added so that the total amount reached 100 mass % |

As a result of measuring the pHs (25° C.) of Magenta Inks 1 to 4 using a pH meter WM-50EG (manufactured by DKK-Toa Corporation), the pH values were all 8.5.

—Preparation of Comparative Magenta Ink c1—

| | |
|---|---|
| Resin-coated magenta pigment dispersion | 6 mass % |
| Compound R-1 (water-soluble photo-polymer initiator) | 2 mass % |
| Polymerizing Compound M-1 | 15 mass % |
| Olefin E1010 (produced by Nissin Chemical Co., Ltd.; surfactant) | 1 mass % |
| Ion exchange water | added so that the total amount reached 100 mass % |

—Preparation of Comparative Magenta Ink c2—

| | |
|---|---|
| Resin-coated magenta pigment dispersion | 6 mass % |
| Compound R-2 (water-soluble photo-polymer initiator) | 1 mass % |
| N-methyl diethanolamine (produced by Tokyo Chemical Industry Co., Ltd.) | 1 mass % |
| Polymerizing Compound M-1 | 15 mass % |
| Olefin E1010 (produced by Nissin Chemical Co., Ltd.; surfactant) | 1 mass % |
| Ion exchange water | added so that the total amount reached 100 mass % |

—Preparation of Comparative Magenta Ink c3—

| | |
|---|---|
| Resin-coated magenta pigment dispersion | 6 mass % |
| Compound R-3 (water-soluble photo-polymer initiator) | 4 mass % |
| Polymerizing Compound M-1 | 10 mass % |
| Olefin E1010 (produced by Nissin Chemical Co., Ltd.; surfactant) | 1 mass % |
| Ion exchange water | added so that the total amount reached 100 mass % |

—Preparation of Comparative Magenta Ink c4—

| | |
|---|---|
| Resin-coated magenta pigment dispersion | 6 mass % |
| Compound R-4 (water-soluble photo-polymer initiator) | 4 mass % |
| Polymerizing Compound M-1 | 10 mass % |
| Olefin E1010 (produced by Nissin Chemical Co., Ltd.; surfactant) | 1 mass % |
| Ion exchange water | added so that the total amount reached 100 mass % |

—Preparation of Comparative Magenta Ink c5—

| | |
|---|---|
| Resin-coated magenta pigment dispersion | 6 mass % |
| Compound R-1 (water-soluble photo-polymer initiator) | 3 mass % |
| Polymerizing Compound M-1 | 10 mass % |
| Olefin E1010 (produced by Nissin Chemical Co., Ltd.; surfactant) | 1 mass % |
| NDSB-256 (produced by Wako Pure Chemical Industries, Ltd.; betaine-type surfactant) | 3 mass % |
| Ion exchange water | added so that the total amount reached 100 mass % |

—Preparation of Comparative Magenta Ink c6—

| | |
|---|---|
| Resin-coated magenta pigment dispersion | 6 mass % |
| Compound R-2 (water-soluble photo-polymer initiator) | 3 mass % |
| N-methyl diethanolamine (produced by Tokyo Chemical Industry Co., Ltd.) | 3 mass % |
| Polymerizing Compound M-1 | 10 mass % |
| Olefin E1010 (produced by Nissin Chemical Co., Ltd.; surfactant) | 1 mass % |
| NDSB-256 (produced by Wako Pure Chemical Industries, Ltd.; betaine-type surfactant) | 3 mass % |
| Ion exchange water | added so that the total amount reached 100 mass % |

[Preparation of Treatment Fluid]

Materials described below were mixed, thereby producing Treatment Fluid 1. As a result of measuring the pH (25° C.) of Treatment Fluid 1 using a pH meter WM-50EG (manufactured by DKK-Toa Corporation), the pH was 1.0.

—Composition of Treatment Fluid 1—

| Malonic acid | 25 mass % |
|---|---|
| Tripropylene glycol monomethyl ether (water-soluble organic solvent) | 5 mass % |
| Ion exchange water | 70 mass % |

—Composition of Treatment Fluid 2—

| Malonic acid | 30 mass % |
|---|---|
| 2-mercaptobenzothiazole | 5 mass % |
| Acetonitrile | 30 mass % |
| Tripropylene glycol monomethyl ether (water-soluble organic solvent) | 5 mass % |
| Ion exchange water | 30 mass % |

[Ink Jet Recording]

As a recording medium (coated paper), Tokubishi Art double-sided N paper (manufactured by Mitsubishi paper Mills Limited) (basis weight 104.7 g/m$^2$) was prepared, an image was formed as described below, and the formed image was evaluated as described below.

Line images and solid images were formed through four-color single pass recording using Ink Sets 1 to 7 and Comparative Ink Sets c1 to c6 prepared above.

At this time, regarding the line images, line images were formed in forms of a line as wide as one 1200 dpi dot, a line as wide as two dots, and a line as wide as four dots by discharging the ink compositions in the main scanning direction through a single pass.

In addition, the solid images were formed by discharging the ink compositions to all the entire surfaces of samples obtained by cutting the recording medium into the A5 size. A variety of conditions for forming the images are as described below.

(1) Treatment Fluid Supply Step

The treatment fluids were applied to all the entire surfaces of the recording media using a roll coater in which the application amount was controlled using an anilox roller (the number of lines per inch was in a range of 100 to 300) so that the supply amount reached 1.4 g/m$^2$.

(2) Treatment Step

Next, on the recording media to which the treatment fluids had been applied, a drying treatment and a permeation treatment were carried out under the following conditions.

Wind speed: 10 m/s

Temperature: the recording medium was heated using a contact-type planar heater from the side (rear surface side) opposite to the recording surface side of the recording medium so that the surface temperature of the recording medium on the recording surface side reached 60° C.

(3) Ink Supply Step

After that, the ink compositions were discharged using the ink jet method under the following conditions to the coated surfaces of the recording media on which the treatment fluids had been applied, thereby forming line images and solid images respectively.

Head: as many as four colors of piezo full line heads as wide as 1,200 dpi/20 inch were disposed Amount of liquid droplets discharged: 2.0 pL Driving frequency: 30 kHz (4) Ink-Drying Step Next, the recording media to which the ink compositions had been supplied were dried under the following conditions.

Drying method: blast drying

Wind speed: 15 m/s

Temperature: the recording medium was heated using a contact-type planar heater from the side (rear surface side) opposite to the recording surface side of the recording medium so that the surface temperature of the recording medium on the recording surface side reached 60° C.

(5) Immobilizing Step

Next, an ultraviolet ray was radiated on the recorded images as the active energy ray using a metal halide lamp under an energy condition of 1000 mJ/cm$^2$, thereby obtaining image records.

[Evaluation]

The degrees of solubility of the polymerization initiators, the stability of the inks, and the curing properties of the obtained image records were tested as described below.

[Degree of Solubility]

3 mass % aqueous solutions were respectively prepared using Polymerization Initiators I-1 to I-5, I-8, and R-1 to R-4, and the degrees of solubility of the polymerization initiators were evaluated according to the following evaluation standards.

—Evaluation Standards—

A: The polymerization initiator was fully dissolved at room temperature.

B: The polymerization initiator was slightly precipitated at room temperature, and was fully dissolved when being heated at 60° C.

C: The polymerization initiator was not fully dissolved even when being heated at 60° C.

[Ink Stability]

Magenta Inks 1 to 7 and Comparative Magenta Inks c1 to c6 were subjected to two-hour temporal tests in a constant-temperature tank at 60° C., and were evaluated according to the following evaluation standards.

—Evaluation Standards—

A: The aggregation of the ink was not visible.

B: The aggregation of the ink was slightly visible.

C: The aggregation of the ink was visible, and was at a level causing a practical problem.

—Curing Sensitivity—

Non-printed Tokubishi Art double-sided N paper (manufactured by Mitsubishi paper Mills Limited) was coiled around a paperweight (mass 470 g, size: 15 mm×30 mm×120 mm) (the contact area between the non-printed Tokubishi Art and a recorded image was 150 mm$^2$), and the recorded image was rubbed three times (equivalent of a load of 260 kg/m$^2$). The rubbed print surface was visually observed, and was evaluated according to the following evaluation standards.

—Evaluation Standards—

A . . . The image (color material) on the printed surface was not peeled off.

B . . . The image (color material) on the printed surface was slightly peeled off.

C . . . The image (color material) on the printed surface was peeled off, and was at a level causing a practical problem.

The obtained results are described in Table 1 described below.

TABLE 1

| Ink set No. | Polymerization initiator | Surfactant | Treatment fluid | Degree of solubility | Ink stability | Curing sensitivity | Note |
|---|---|---|---|---|---|---|---|
| 1 | I-1 | Olefin E1010 | 1 | A | A | A | Present Invention |
| 2 | I-2 | Olefin E1010 | 1 | A | A | A | Present Invention |
| 3 | I-5 | Olefin E1010 | 1 | A | A | A | Present Invention |
| 4 | I-3 | Olefin E1010 | 1 | A | A | A | Present Invention |
| 5 | I-8 | Olefin E1010 | 1 | A | A | A | Present Invention |
| 6 | I-4 | Olefin E1010 | 2 | A | A | A | Present Invention |
| 7 | I-1 | NDSB-256 | 1 | A | A | A | Present Invention |
| c1 | R-1 | Olefin E1010 | 1 | C | A | B | Comparative Example |
| c2 | R-2 | Olefin E1010 | 1 | A | C | A | Comparative Example |
| c3 | R-3 | Olefin E1010 | 1 | C | C | C | Comparative Example |
| c4 | R-4 | Olefin E1010 | 1 | A | B | A | Comparative Example |
| c5 | R-1 | NDSB-256 | 1 | C | A | B | Comparative Example |
| c6 | R-2 | NDSB-256 | 1 | A | C | A | Comparative Example |

As is clear from the results of Table 1, the images formed using the photopolymerization initiators having the betaine structure were favorable in terms of both the ink stability and the curing sensitivity compared with the images formed using the photopolymerization initiator of the related art which did not have the betaine structure.

In Ink Sets c5 and c6, a combination of the photopolymerization initiator of the related art which did not have the betaine structure and the betaine-type surfactant was used, but the effects of the present invention were not obtained.

What is claimed is:

1. A curable resin composition comprising:
   fine particles;
   a polymerizable compound having an ethylenic unsaturated group;
   a water soluble photopolymerization initiator having a betaine structure; and
   water,
   wherein the betaine structure of the photopolymerization initiator is represented by at least one of Formulae (1) to (3) described below,

[Chem. 1]

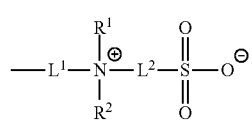
Formula (1)

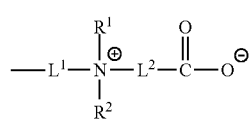
Formula (2)

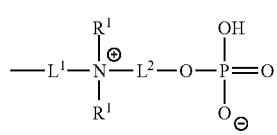
Formula (3)

in Formulae (1) to (3), each of $R^1$ and $R^2$ independently represents an alkyl group, $L^1$ represents a single bond or a divalent linking group, and $L^2$ represents a divalent linking group.

2. The curable resin composition according to claim 1, wherein the photopolymerization initiator having a betaine structure has any of a benzophenone skeleton, a thioxanthone skeleton, a thiochromanone skeleton, a biimidazole skeleton, an α-aminoacetophenone skeleton, an α-hydroxyacetophenone skeleton, or a benzyl ketal skeleton.

3. The curable resin composition according to claim 1, wherein the fine particles are pigments or resin particles.

4. A water-soluble ink composition comprising the curable resin composition according to claim 1.

5. The water-soluble ink composition according to claim 4, wherein the fine particles are pigments.

6. The water-soluble ink composition according to claim 4, wherein at least one of the polymerizable compound having an ethylenic unsaturated group is a bi- or more functional (meth)acrylamide compound.

7. An ink set comprising:
   the water-soluble ink composition according to claim 4; and
   an acidic ink composition containing an acidic compound having a molecular weight in a range of 50 to 200 and pKa in water in a range of 1 to 5.

8. An image-forming method comprising:
supplying an acidic ink composition onto a recording medium; and
supplying the water-soluble ink composition according to claim 4 onto the acid-treated recording medium to form an image.

9. The image-forming method according to claim 8, wherein, in the supplying the water-soluble ink composition step, the ink is supplied by an ink jet method.

10. The curable resin composition according to claim 1, wherein the photopolymerization initiator has a degree of solubility in water that the photopolymerization initiator is fully dissolved at room temperature when 3 mass % of aqueous solution thereof is prepared.

11. A curable resin composition comprising:
fine particles;
a polymerizable compound having an ethylenic unsaturated group;
a water soluble photopolymerization initiator having a betaine structure; and water,
wherein the photopolymerization initiator is a compound represented by following Formula (A), (B), (C), (D), (E), (F) or (G),

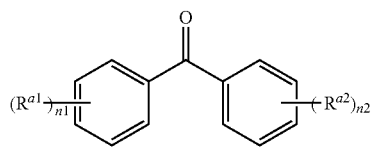

Formula (A)

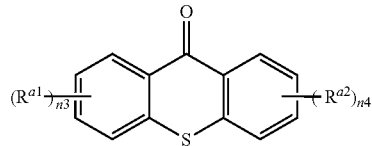

Formula (B)

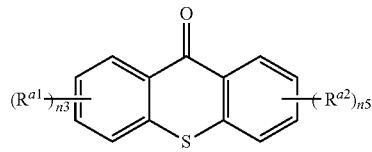

Formula (C)

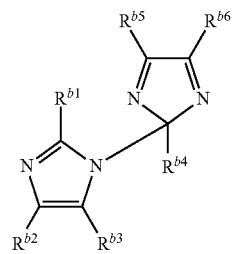

Formula (D)

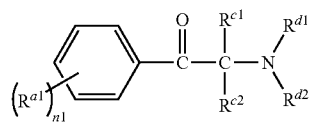

Formula (E)

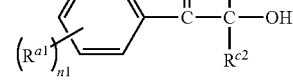

Formula (F)

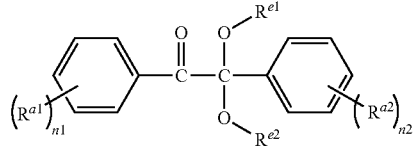

Formula (G)

in Formulae (A) to (G),
each of $R^{a1}$, $R^{a2}$, $R^{b1}$ to $R^{b6}$, $R^{c1}$, $R^{c2}$, $R^{e1}$ and $R^{e2}$ independently represents a substituent;
each of $R^{d1}$ and $R^{d2}$ independently represents a hydrogen atom or a substituent;
$R^{d1}$ and $R^{d2}$ may be bonded to each other so as to form a ring;
each of n1 and n2 independently represents an integer of 0 to 5, and each of n3 and n4 independently represents an integer of 0 to 4, n1+n2 is in a range of 1 to 10, and n3+n4 and n3+n5 are in a range of 1 to 8; and
any one of $R^{a1}$ and $R^{a2}$ in Formulae (A), (B), and (C), $R^{b1}$ to $R^{b6}$ in Formula (D), $R^{a1}$, $R^{c1}$, $R^{c2}$, $R^{d1}$, and $R^{d2}$ in Formula (E), $R^{a1}$, $R^{c1}$, and $R^{c2}$ in Formula (F), $R^{a1}$, $R^{a2}$, $R^{e1}$, and $R^{e2}$ in Formula (G) is a substituent having a betaine structure.

* * * * *